(12) United States Patent
Gallo et al.

(10) Patent No.: US 9,779,183 B2
(45) Date of Patent: Oct. 3, 2017

(54) SENSOR MANAGEMENT AND SENSOR ANALYTICS SYSTEM

(71) Applicants: Allied Telesis Holdings Kabushiki Kaisha, Tokyo (JP); ALLIED TELESIS, INC., Bothell, WA (US)

(72) Inventors: Joseph L. Gallo, Santa Cruz, CA (US); Ferdinand E. K. de Antoni, Manila (PH); Scott Gill, Makati (PH); Daniel Stellick, Geneva, IL (US)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 14/281,901

(22) Filed: May 20, 2014

(65) Prior Publication Data

US 2015/0339407 A1    Nov. 26, 2015

Related U.S. Application Data

(63) Continuation-in-part of application No. 14/281,896, filed on May 20, 2014, now abandoned, which is a continuation-in-part of application No. 14/281,904, filed on May 20, 2014, now abandoned.

(51) Int. Cl.
  *G06F 17/30* (2006.01)
  *G05B 19/048* (2006.01)
  *G08B 25/10* (2006.01)

(52) U.S. Cl.
  CPC ..... *G06F 17/30997* (2013.01); *G05B 19/048* (2013.01); *G06F 17/30864* (2013.01); *G08B 25/10* (2013.01)

(58) Field of Classification Search
  CPC ................... G06F 17/30997; G06F 17/30864
  USPC ................................. 707/736, 770
  See application file for complete search history.

(56) References Cited

U.S. PATENT DOCUMENTS

| | | |
|---|---|---|
| 4,970,391 A | 11/1990 | Uber |
| 6,047,244 A | 4/2000 | Rud |
| 6,642,843 B2 | 11/2003 | Satoh |
| 6,686,838 B1 | 2/2004 | Rezvani et al. |
| 7,030,752 B2 * | 4/2006 | Tyroler ......................... 340/531 |
| 7,091,854 B1 | 8/2006 | Miao |
| 7,555,412 B2 | 6/2009 | Nath et al. |
| 8,575,560 B1 | 11/2013 | Fechner |

(Continued)

FOREIGN PATENT DOCUMENTS

| | | |
|---|---|---|
| JP | 2007085755 A | 4/2007 |
| KR | 1020070028813 A | 3/2007 |

(Continued)

OTHER PUBLICATIONS

K Aberer et al., Infrastructure for data processing in large-scale interconnected sensor networks, 2007, IEEE, 198-205.*

(Continued)

*Primary Examiner* — Jean B Fleurantin
(74) *Attorney, Agent, or Firm* — Brooks Acordia IP Law, P.C.; Michael Zarrabian

(57) ABSTRACT

Systems, apparatuses, and methods described herein are configured for monitoring and managing a plurality of sensors. The plurality of sensors may be fixed, mobile, or a combination thereof. In some embodiments, the monitoring and management of the sensors is facilitated via a graphical user interface.

18 Claims, 24 Drawing Sheets

(56) References Cited

U.S. PATENT DOCUMENTS

| | | |
|---|---|---|
| 8,732,592 B2 | 5/2014 | Nielsen et al. |
| 2003/0058095 A1 | 3/2003 | Satoh |
| 2003/0107650 A1 | 6/2003 | Colmenarez et al. |
| 2004/0164859 A1 | 8/2004 | Spisa |
| 2005/0248454 A1 | 11/2005 | Hanson et al. |
| 2006/0047419 A1 | 3/2006 | Diendorf et al. |
| 2006/0086913 A1 | 4/2006 | Spahn |
| 2006/0097171 A1 | 5/2006 | Balchunas et al. |
| 2007/0044539 A1 | 3/2007 | Sabol et al. |
| 2007/0143079 A1 | 6/2007 | Duxbury et al. |
| 2007/0195712 A1 | 8/2007 | Thayer et al. |
| 2007/0222585 A1 | 9/2007 | Sabol et al. |
| 2007/0265866 A1 | 11/2007 | Fehling et al. |
| 2008/0036585 A1 | 2/2008 | Gould |
| 2008/0191871 A1 | 8/2008 | Horak et al. |
| 2008/0249791 A1 | 10/2008 | Iyer |
| 2008/0271143 A1 | 10/2008 | Stephens et al. |
| 2009/0006589 A1 | 1/2009 | Forbes et al. |
| 2009/0033487 A1 | 2/2009 | McFadden et al. |
| 2009/0063122 A1* | 3/2009 | Nasle .............. 703/18 |
| 2009/0119142 A1 | 5/2009 | Yenni et al. |
| 2009/0201896 A1 | 8/2009 | Davis et al. |
| 2009/0236538 A1 | 9/2009 | Frank |
| 2010/0274592 A1 | 10/2010 | Nitzan et al. |
| 2010/0315242 A1 | 12/2010 | Bullard et al. |
| 2011/0074596 A1 | 3/2011 | Frohlick et al. |
| 2011/0148905 A1 | 6/2011 | Simmons et al. |
| 2011/0153655 A1 | 6/2011 | Kim et al. |
| 2011/0161885 A1 | 6/2011 | Gonia et al. |
| 2011/0193704 A1 | 8/2011 | Harper et al. |
| 2012/0001754 A1 | 1/2012 | Kraus et al. |
| 2012/0002733 A1* | 1/2012 | Misra et al. .............. 375/259 |
| 2012/0042326 A1 | 2/2012 | Jain et al. |
| 2012/0150783 A1 | 6/2012 | Jung et al. |
| 2012/0197911 A1 | 8/2012 | Banka et al. |
| 2012/0212574 A1 | 8/2012 | Blumenfeld |
| 2012/0280798 A1 | 11/2012 | Li et al. |
| 2012/0313779 A1 | 12/2012 | Papaefstathiou et al. |
| 2012/0323623 A1 | 12/2012 | Sabharwal |
| 2013/0009780 A1 | 1/2013 | Marshall et al. |
| 2013/0124597 A1 | 5/2013 | Diao et al. |
| 2013/0184031 A1 | 7/2013 | Pollington et al. |
| 2013/0262349 A1 | 10/2013 | Bouqata et al. |
| 2013/0304385 A1 | 11/2013 | Gillette, II |
| 2013/0338465 A1 | 12/2013 | Taub et al. |
| 2014/0028457 A1 | 1/2014 | Reinpoldt et al. |
| 2014/0074982 A1* | 3/2014 | Misra et al. .............. 709/217 |
| 2014/0118123 A1 | 5/2014 | Lim et al. |
| 2014/0266793 A1 | 9/2014 | Velado et al. |
| 2014/0278646 A1 | 9/2014 | Adrian et al. |
| 2014/0280319 A1 | 9/2014 | Rishe |
| 2014/0287782 A1 | 9/2014 | Davis et al. |
| 2014/0347186 A1 | 11/2014 | Harper et al. |
| 2015/0178657 A1 | 6/2015 | Kleehammer et al. |
| 2015/0189005 A1 | 7/2015 | Dubois et al. |
| 2015/0192682 A1 | 7/2015 | Valentino et al. |
| 2015/0213631 A1 | 7/2015 | Broek |
| 2015/0213703 A1 | 7/2015 | Filson et al. |
| 2015/0248275 A1 | 9/2015 | Gallo et al. |
| 2015/0339594 A1* | 11/2015 | Gallo et al. .............. 705/5 |

FOREIGN PATENT DOCUMENTS

| | | |
|---|---|---|
| KR | 100900937 B1 | 6/2009 |
| KR | 1020110053145 A | 5/2011 |
| KR | 1020130038549 A | 4/2013 |
| KR | 1020130115445 A | 10/2013 |

OTHER PUBLICATIONS

Department of Climate Change and Energy Efficiency, National Greenhouse and Energy Reporting System Measurement: Technical Guidelines for the estimation of greenhouse gas emissions by facilities in Australia (Department of Climate Change and Energy Efficiency, 2012), All Pages.

Gunther Schadow et al., The Unified Code for Units of Measure, (2009) http://web.archive.org/web/20130116071912/http://unitsofmeasure.org/ucum.html., All Pages.

International Search Report for serial No. PCT/US2015/031632 dated Aug. 27, 2015, all pages.

International Search Report for serial No. PCT/US2015/031644 dated Aug. 27, 2015, all pages.

International Search Report for serial No. PCT/US2015/031825 dated Aug. 11, 2015, all pages.

International Search Report for serial No. PCT/US2015/031835 dated Aug. 26, 2015, all pages.

* cited by examiner

FIG 13

SENSOR MANAGEMENT AND SENSOR ANALYTICS SYSTEM

RELATED APPLICATIONS

This application is a continuation in part of U.S. patent application Ser. No. 14/281,896, filed May 20, 2014, entitled "SENSOR BASED DETECTION SYSTEM", by Joseph L. Gallo et al. and incorporated by reference herein.

This application is a continuation in part of U.S. patent application Ser. No. 14/281,904, filed May 20, 2014, entitled "EVENT MANAGEMENT FOR A SENSOR BASED DETECTION SYSTEM", by Joseph L. Gallo et al. and incorporated by reference herein.

BACKGROUND

As technology has advanced, computing technology has proliferated to an increasing number of areas while decreasing in price. Consequently, devices such as smartphones, laptops, GPS, etc., have become prevalent in our community, thereby increasing the amount of data being gathered in an ever increasing number of locations. Unfortunately, most of the gathered information is used for marketing and advertising to the end user, e.g., smartphone user receives a coupon to a nearby Starbucks, etc., while the security of our community is left exposed and at a risk of terrorist attacks such as the Boston Marathon bombers.

SUMMARY

Accordingly, a need has arisen for a solution to allow monitoring and collection of data from a plurality of sensors and management of the plurality of sensors for improving security of our communities, e.g., by detecting radiation, etc. Further, there is a need to provide relevant information based on the sensors in an efficient manner to increase security.

Embodiments described herein provide unique methods and systems for monitoring and managing a plurality of sensors and sensor analytics processes. The embodiments allow configuration of parameters for sensors (e.g., metadata, etc.) and further allow configuration of parameters for sensor analytics processes. The sensor metadata may be stored with the associated analyzed sensor data from the sensor analytics processes (e.g., in a data warehouse). The configuration parameters for the sensor analytics processes may be used to launch and configure the sensor analytics processes. The embodiments are further configured for monitoring sensor analytics processes to ensure that sensor analysis processes are running properly (e.g., are healthy). In some embodiments, proper operation of a sensor analytics process is determined based on the configuration parameters associated with the sensor analytics process. The embodiments further support load balancing or distribution of sensor analytics processes across multiple computing systems (e.g., virtual or physical machines).

One embodiment is directed to a method for monitoring and managing sensors. The method includes receiving a plurality of configuration parameters associated with a plurality of sensor analytics processes and initiating the plurality of sensor analytics processes based on the plurality of configuration parameters. Each sensor analytics process of the plurality of sensor analytics processes is associated with a respective sensor. The method further includes receiving analytics data from the plurality of sensor analytics processes and storing the analytics data from the plurality of sensor analytics processes in a non-transitory storage medium.

In some embodiments, the analytics data is stored in a data warehouse, and processing of the analytics data is configured to determine whether a state change associated with a sensor has occurred. In some embodiments, the method may further include displaying a group of configuration parameters of the plurality of configuration parameters that is associated with a sensor analytics process of the plurality of sensor analytics processes in a graphical user interface and receiving a request to modify the group of configuration parameters. In some embodiments, the method may further include updating configuration parameters of the group of configuration parameters based on the request.

In some embodiments, the method may further include accessing metadata associated with a sensor of the plurality of sensors and the storing further comprises storing the metadata associated with the sensor of the plurality of sensors with respective analytics data from a respective sensor analytics process of the plurality of sensor analytics processes. In some embodiments, the method may further include displaying the metadata associated with the sensor of the plurality of sensors in a graphical user interface and receiving a request to modify the metadata associated with the sensor of the plurality of sensors. In some embodiments, the method may further include updating the metadata associated with the sensor of the plurality of sensors based on the request. In some embodiments, the metadata comprises location information associated with the sensor of the plurality of sensors.

In some embodiments, the method may further include determining an allocation of the plurality of sensor analytics processes over a plurality of execution units. An execution unit of the plurality of execution units is configured to execute one or more of the sensor analytics processes. In some embodiments, an execution unit of the plurality of execution units is a virtual machine. In some embodiments, the method may further include determining a health indicator associated with a sensor analytics process of the plurality of sensor analytics processes. In some embodiments, the determining may be based on respective analytics data received from the respective sensor analytics process.

Another embodiment is directed to a method for monitoring and managing sensors. The method includes receiving configuration parameters associated with a sensor analytics process that is associated with a sensor of a plurality of sensors and accessing metadata associated with the sensor. The method further includes initiating the sensor analytics process based on the configuration parameters and receiving analytics data from the sensor analytics process. The analytics data may then be stored with the metadata in a non-transitory storage medium. In some embodiments, the metadata comprises location information of the sensor. In some embodiments, the analytics data and the metadata are stored in a data warehouse configured to determine a state change of the sensor based on the analytics data.

In some embodiments, the method further includes determining a health indicator of the sensor analytics process based on the analytics data received from the sensor analytics process. In some embodiments, the method further includes restarting the sensor analytics process in response to determining that the sensor analytics process is associated with a negative health indicator. In some embodiments, the method further includes receiving configuration parameters associated with other sensor analytics processes. In some embodiments, the method further includes initiating the other sensor analytics processes based on the configuration parameters associated with the other sensor analytics processes and determining an allocation of the plurality of sensor analytics processes over a plurality of execution units, wherein an execution unit is configured to execute at least two sensor analytics processes. In some embodiments, an execution unit of the plurality of execution units is a virtual machine.

Another embodiment is directed to a non-transitory computer-readable storage medium having stored thereon, computer executable instructions that, if executed by a device, causes the device to perform a method. The method includes receiving configuration parameters associated with a sensor analytics process and initiating the sensor analytics process based on the configuration parameters. The sensor analytics process is associated with a sensor of a plurality of sensors. The method further includes receiving analytics data from the sensor analytics process and determining a health indicator of the sensor analytics process based on analytics data received from the sensor analytics process. The analytics data from the sensor analytics process may then be stored in a non-transitory storage medium.

In some embodiments, the method further includes reconfiguring the sensor analytics process based on the health indicator. In some embodiments, the method further includes receiving configuration parameters associated with other sensor analytics processes and initiating the other sensor analytics processes based on the configuration parameters associated with the other sensor analytics processes. In some embodiments, the method further includes determining an allocation of the plurality of sensor analytics processes over a plurality of execution units, wherein an execution unit is configured to execute at least two sensor analytics processes. In some embodiments, an execution unit of the plurality of the execution units is a virtual machine.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

FIG. 13 shows a block diagram of an exemplary graphical user interface configured for editing location information associated with one or more sensors in accordance with one embodiment.

DETAILED DESCRIPTION

Figure 1:
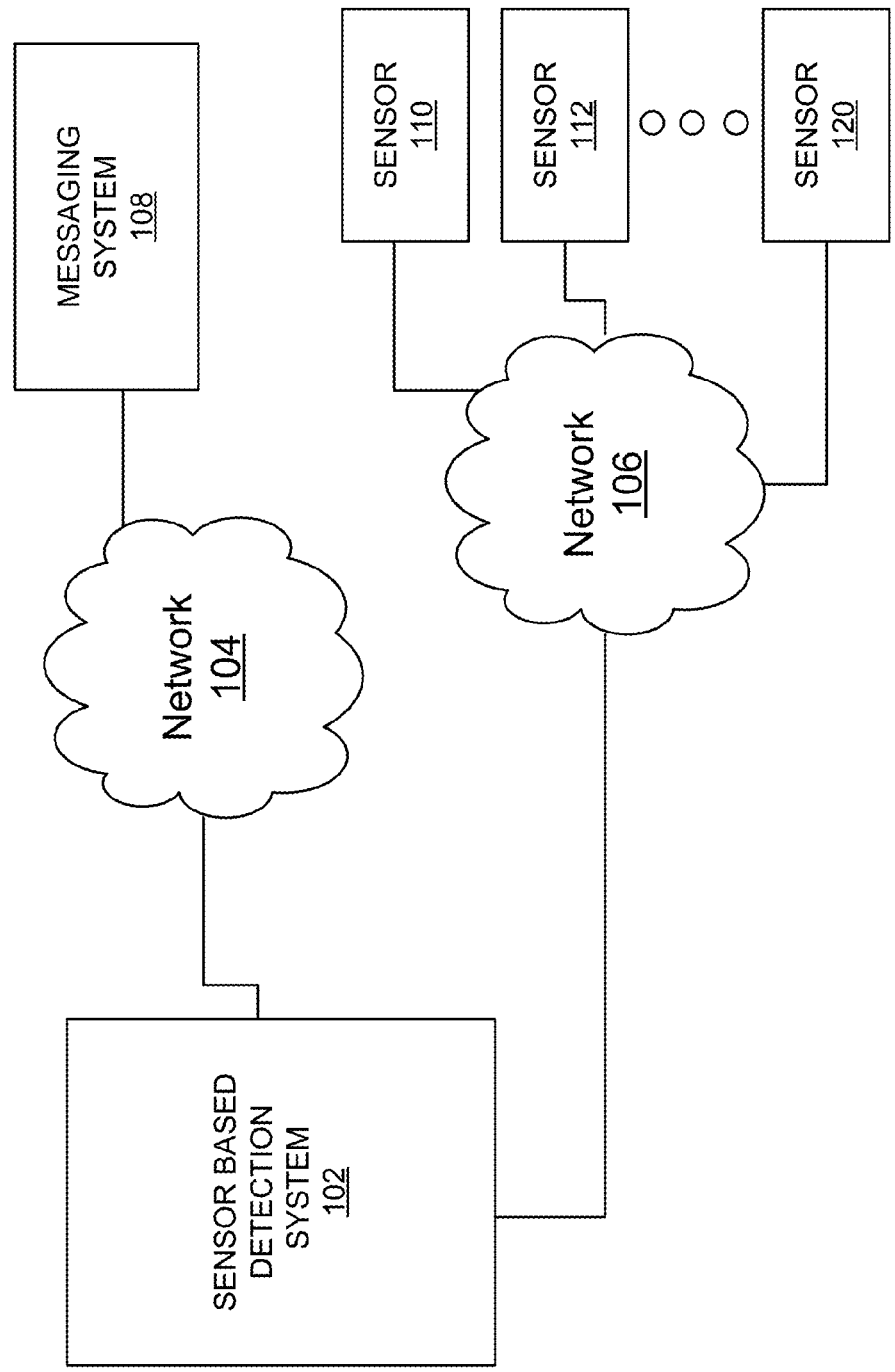
FIG. 1 shows an exemplary operating environment of an exemplary sensor based detection system in accordance with one embodiment.

Reference will now be made in detail to various embodiments, examples of which are illustrated in the accompanying drawings. While the claimed embodiments will be described in conjunction with various embodiments, it will be understood that these various embodiments are not intended to limit the scope of the embodiments. On the contrary, the claimed embodiments are intended to cover alternatives, modifications, and equivalents, which may be included within the scope of the appended Claims. Furthermore, in the following detailed description numerous specific details are set forth in order to provide a thorough understanding of the claimed embodiments. However, it will be evident to one of ordinary skill in the art that the claimed embodiments may be practiced without these specific details. In other instances, well known methods, procedures, components, and circuits are not described in detail so that aspects of the claimed embodiments are not obscured.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "converting," "transmitting," "storing," "determining," "sending," "querying," "providing," "accessing," "associating," "configuring," "initiating," "customizing", "mapping," "modifying," "analyzing," "displaying," "updating," "reconfiguring," "restarting," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data, that are non-transitory. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Sensor Management and Sensor Analytics System

Accordingly, a need has arisen for a solution to allow monitoring and collection of data from a plurality of sensors and management of the plurality of sensors for improving security of our communities, e.g., by detecting radiation, etc. Further, there is a need to provide relevant information based on the sensors in an efficient manner to increase security.

Embodiments described herein provide unique methods and systems for monitoring and managing a plurality of sensors and sensor analytics processes. The embodiments allow configuration of parameters for sensors (e.g., metadata such as their name, description, location, longitude, latitude, building, floor, campus, description, etc.) and parameters for sensor analytics processes. The sensor analytics processes may access or receive sensor data from the sensors and analyze the sensor data (e.g., at a given interval). The sensor metadata may be stored with its respective associated analyzed sensor data from the sensor analytics processes (e.g., in a data warehouse). The configuration parameters for the sensor analytics processes may be used to launch and configure the sensor analytics processes. The embodiments are further configured for monitoring sensor analytics processes to ensure that sensor analysis processes are running properly (e.g., or are healthy). In some embodiments, proper operation of a sensor analytics process is determined based on the configuration parameters associated with the sensor analytics process. The embodiments further support load balancing or distribution of sensor analytics processes across multiple computing systems (e.g., virtual or physical machines). It is appreciated that the embodiments are described herein within the context of radiation detection and gamma ray detection merely for illustrative purposes and are not intended to limit the scope.

FIG. 1 shows an exemplary operating environment in accordance with one embodiment. Exemplary operating environment 100 includes a sensor based detection system 102, a network 104, a network 106, a messaging system 108, and sensors 110-120. The sensor based detection system 102 and the messaging system 108 are coupled to a network 104. The sensor based detection system 102 and messaging system 108 are communicatively coupled via the network 104. The sensor based detection system 102 and sensors 110-120 are coupled to a network 106. The sensor based detection system 102 and sensors 110-120 are communicatively coupled via network 106. Networks 104, 106 may include more than one network (e.g., intranets, the Internet, local area networks (LAN)s, wide area networks (WAN)s, etc.) and may be a combination of one or more networks including the Internet. In some embodiments, network 104 and network 106 may be a single network.

The sensors 110-120 detect a reading associated therewith, e.g., gamma radiation, vibration, etc., and transmit that information to the sensor based detection system 102 for analysis. The sensor based detection system 102 may use the received information and compare it to a threshold value, e.g., historical values, user selected values, etc., in order to determine whether a potentially hazardous event has occurred. In response to the determination, the sensor based detection system 102 may transmit that information to the messaging system 108 for appropriate action, e.g., emailing the appropriate personnel, sounding an alarm, tweeting an alert, alerting the police department, alerting homeland security department, etc. Accordingly, appropriate actions may be taken in order to avert the risk.

The sensors 110-120 may be any of a variety of sensors including thermal sensors (e.g., temperature, heat, etc.), electromagnetic sensors (e.g., metal detectors, light sensors, particle sensors, Geiger counter, charge-coupled device (CCD), etc.), mechanical sensors (e.g. tachometer, odometer, etc.), complementary metal-oxide-semiconductor (CMOS), biological/chemical (e.g., toxins, nutrients, etc.), etc. The sensors 110-120 may further be any of a variety of sensors or a combination thereof including, but not limited to, acoustic, sound, vibration, automotive/transportation, chemical, electrical, magnetic, radio, environmental, weather, moisture, humidity, flow, fluid velocity, ionizing, atomic, subatomic, navigational, position, angle, displacement, distance, speed, acceleration, optical, light imaging, photon, pressure, force, density, level, thermal, heat, temperature, proximity, presence, radiation, Geiger counter, crystal based portal sensors, biochemical, pressure, air quality, water quality, fire, flood, intrusion detection, motion detection, particle count, water level, surveillance cameras, etc. The sensors 110-120 may be video cameras (e.g., internet protocol (IP) video cameras) or purpose built sensors.

The sensors 110-120 may be fixed in location (e.g., surveillance cameras or sensors), semi-fixed (e.g., sensors on a cell tower on wheels or affixed to another semi portable object), or mobile (e.g., part of a mobile device, smartphone, etc.). The sensors 110-120 may provide data to the sensor based detection system 102 according to the type of the sensors 110-120. For example, sensors 110-120 may be CMOS sensors configured for gamma radiation detection. Gamma radiation may thus illuminate a pixel, which is converted into an electrical signal and sent to the sensor based detection system 102.

The sensor based detection system 102 is configured to receive data and manage sensors 110-120. The sensor based detection system 102 is configured to assist users in monitoring and tracking sensor readings or levels at one or more locations. The sensor based detection system 102 may have various components that allow for easy deployment of new sensors within a location (e.g., by an administrator) and allow for monitoring of the sensors to detect events based on user preferences, heuristics, etc. The events may be used by the messaging system 108 to generate sensor-based alerts (e.g., based on sensor readings above a threshold for one sensor, based on the sensor readings of two sensors within a certain proximity being above a threshold, etc.) in order for the appropriate personnel to take action. The sensor based detection system 102 may receive data and manage any number of sensors, which may be located at geographically disparate locations. In some embodiments, the sensors 110-120 and components of a sensor based detection system 102 may be distributed over multiple systems (e.g., and virtualized) and a large geographical area.

The sensor based detection system 102 may track and store location information (e.g., board room B, floor 2, terminal A, etc.) and global positioning system (GPS) coordinates, e.g., latitude, longitude, etc. for each sensor or group of sensors. The sensor based detection system 102 may be configured to monitor sensors and track sensor values to determine whether a defined event has occurred, e.g., whether a detected radiation level is above a certain threshold, etc., and if so then the sensor based detection system 102 may determine a route or path of travel that dangerous or contraband material is taking around or within range of the sensors. For example, the path of travel of radioactive material relative to fixed sensors may be determined and displayed via a graphical user interface. It is appreciated that the path of travel of radioactive material relative to mobile sensors, e.g., smartphones, etc., or relative to a mixture of fixed and mobile sensors may similarly be determined and displayed via a graphical user interface. It is appreciated that the analysis and/or the sensed values may be displayed in real-time or stored for later retrieval.

The sensor based detection system 102 may display a graphical user interface (GUI) for monitoring and managing sensors 110-120. The GUI may be configured for indicating sensor readings, sensor status, sensor locations on a map, etc. The sensor based detection system 102 may allow review of past sensor readings and movement of sensor detected material or conditions based on stop, play, pause, fast forward, and rewind functionality of stored sensor values. The sensor based detection system 102 may also allow viewing of image or video footage corresponding to sensors that had sensor readings above a threshold (e.g., based on a predetermined value or based on ambient sensor readings). For example, a sensor may be selected in a GUI and video footage associated with an area within a sensor's range of detection may be displayed, thereby enabling a user to see an individual transporting hazardous material. According to one embodiment the footage is displayed in response to a user selection or it may be displayed automatically in response to a certain event, e.g., sensor reading associated with a particular sensor or group of sensors being above a certain threshold.

In some embodiments, sensor readings of one or more sensors may be displayed on a graph or chart for easy viewing. A visual map-based display depicting sensors may be displayed with the sensors color coded according to the sensors' readings and certain events. For example, gray may be associated with a calibrating sensor, green may be associated with a normal reading from the sensor, yellow may be associated with an elevated sensor reading, orange associated with a potential hazard sensor reading, and red associated with a hazard alert sensor reading.

The sensor based detection system 102 may determine alerts or sensor readings above a specified threshold (e.g., predetermined, dynamic, or ambient based) or based on heuristics and display the alerts in the graphical user interface (GUI). The sensor based detection system 102 may allow a user (e.g., operator) to group multiple sensors together to create an event associated with multiple alerts from multiple sensors. For example, a code red event may be created when three sensors or more within twenty feet of one another and within the same physical space have a sensor reading that is at least 40% above the historical values. In some embodiments, the sensor based detection system 102 may automatically group sensors together based on geographical proximity of the sensors, e.g., sensors of gates 1, 2, and 3 within terminal A at LAX airport may be grouped together due to their proximate location with respect to one another, e.g., physical proximity within the same physical space, whereas sensors in different terminals may not be grouped because of their disparate locations. However, in certain circumstances sensors within the same airport may be grouped together in order to monitor events at the airport and not at a more granular level of terminals, gates, etc.

The sensor based detection system 102 may send information to a messaging system 108 based on the determination of an event created from the information collected from the sensors 110-120. The messaging system 108 may include one or more messaging systems or platforms which may include a database (e.g., messaging, SQL, or other database), short message service (SMS), multimedia messaging service (MMS), instant messaging services, Twitter™ available from Twitter, Inc. of San Francisco, Calif., Extensible Markup Language (XML) based messaging service (e.g., for communication with a Fusion center), JavaScript™ Object Notation (JSON) messaging service, etc. For example, national information exchange model (NIEM) compliant messaging may be used to report chemical, biological, radiological and nuclear defense (CBRN) suspicious activity reports (SARs) to report to government entities (e.g., local, state, or federal government).

Figure 2:
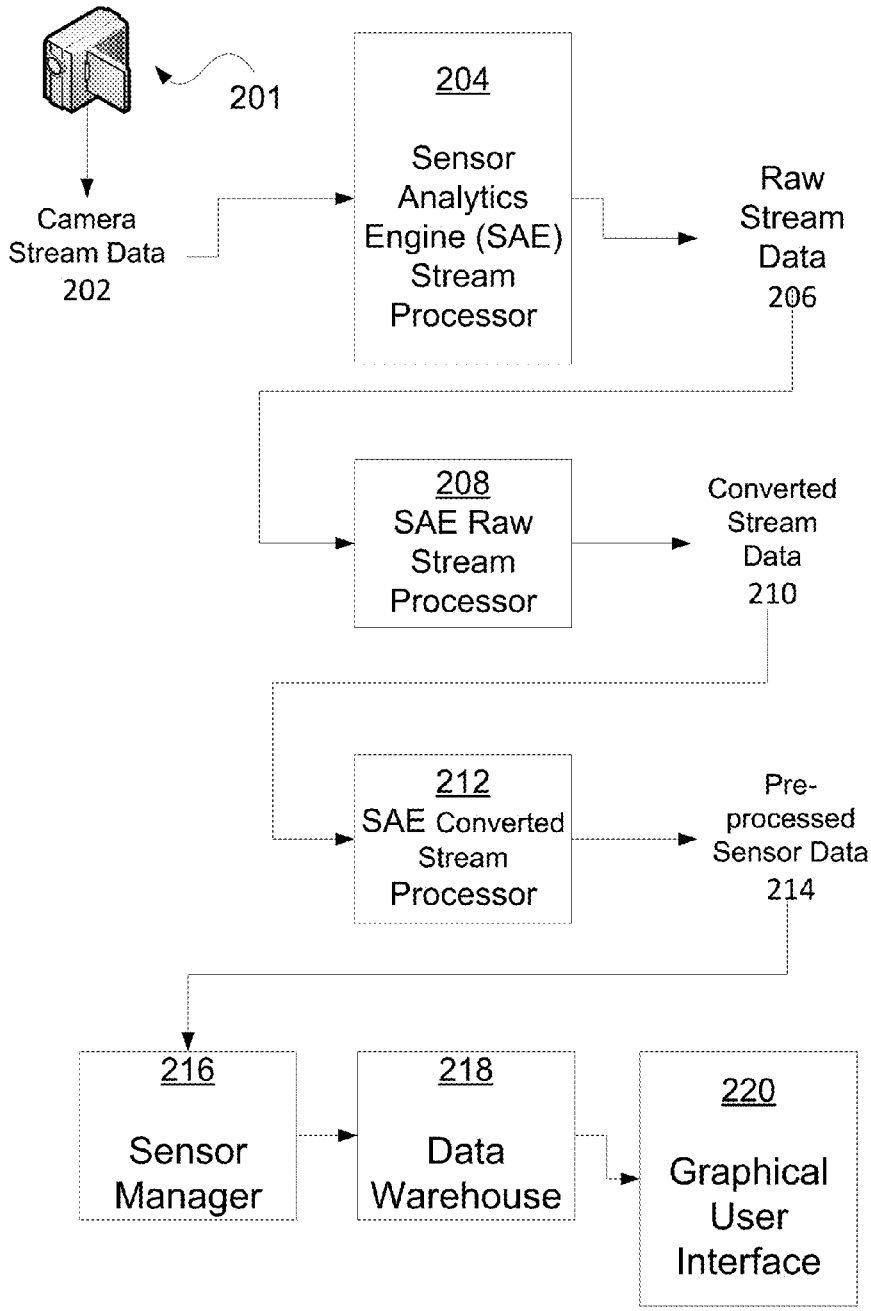
FIG. 2 shows an exemplary data flow diagram in accordance with one embodiment.

FIG. 2 shows an exemplary data flow diagram in accordance with one embodiment. Diagram 200 depicts the flow of data (e.g., sensor readings) associated with a sensor based detection system (e.g., sensor based detection system 102). Diagram 200 includes a camera 201 having a sensor (e.g., a CMOS based sensor) camera stream data 202, a sensor analytics engine (SAE) stream processor 204, raw stream data 206, a SAE raw stream processor 208, converted stream data 210, an SAE converted stream processor 212, preprocessed data 214, a sensor manager 216, a data warehouse 218, and a graphical user interface 220. In some embodiments, each of SAE the stream processor 204, the SAE raw stream processor 208, and the SAE converted stream processor 212 may be sensor analytics processes (e.g., each with different configurations). In some embodiments, the SAE stream processor 204, the SAE raw stream processor 208, and the SAE converted stream processor 212 may be instances of a single sensor analytics process with different configurations.

The camera 201 is an exemplary sensor. The embodiments may support any type of sensor, as described herein. The camera 201 outputs camera stream data 202, which is received by a sensor analytics engine (SAE) stream processor 204. The SAE stream processor 204 analyzes the camera stream data 202 and outputs raw stream data 206. The raw stream data may be the raw data from the sensor. For example, the raw stream data 206 may be video streams (e.g., Moving Picture Experts Group (MPEG) video) from the sensor 320. In some embodiments, the SAE stream processor 204 may output the frames of sensor data associated with detection. For example, the SAE stream processor 204 may filter out frames of data without radiation indicators for output as raw stream data 206. In some embodiments, raw stream data 206 may be used to analyze the presence of radiation. The SAE raw stream processor 208 accesses and analyzes the raw stream data 206 to produce a converted stream data 210. Converted stream data 210 may include a count of the hits on the sensor within a sample interval (e.g., gamma ray sample data). For example, converted stream data may include the number of gamma ray hits that occurred on sensor 320.

The SAE converted stream processor 212 accesses and analyzes converted stream data 210 to produce preprocessed sensor data 214. The preprocessed sensor data may include an analysis of converted stream data for a given time period or interval. For example, a preprocessed sensor record may be the result of analyzing the previous 5 minutes of radiation readings. The preprocessed sensor 214 data may include sensor readings over a time interval of the previous five minutes and be generated at specified interval (e.g., 10 second intervals).

The sensor manager 216 may access or receive the preprocessed sensor data 214 from multiple sensor processors, aggregate, and send the preprocessed sensor data 214 to a data warehouse 218. In some embodiments, the preprocessed sensor data 214 is sent to the data warehouse 218 may then store the preprocessed sensor data. In some embodiments, the sensor manager 216 sends the preprocessed sensor data along with the associated metadata of the sensor (e.g., location, geographical position, sensor type, etc.). The metadata of a sensor may include a physical street location, description of the sensor, name of the sensor, floor at which the sensor is positioned in, name of the room, location within a room, geographical position, longitude, latitude, etc. The metadata may further include any particular business measure or metric that a company finds important.

The sensor manager 216 may analyze preprocessed sensor data 214 to determine the health of sensor analytics (e.g., SAE stream processor 204, SAE raw stream processor 208, and SAE converted stream processor 212). For example, the sensor manager 216 may determine whether preprocessed sensor data 214 is being received at regular intervals from the sensor analytics processors or determine whether the preprocessed sensor data 214 has the expected values (e.g., values within a range of previous values).

In some embodiments, the data warehouse 218 may then send the preprocessed sensor data to graphical user interface 220. In some embodiments, graphical user interface 220 accesses the preprocessed sensor data from the data warehouse 218. In some embodiments, when a sensor analytics process is producing preprocessed sensor data, the sensor analytics process may be known as a channel path which generates sensor based signals that can be displayed in a graphical user interface for monitoring sensor readings.

Figure 3:
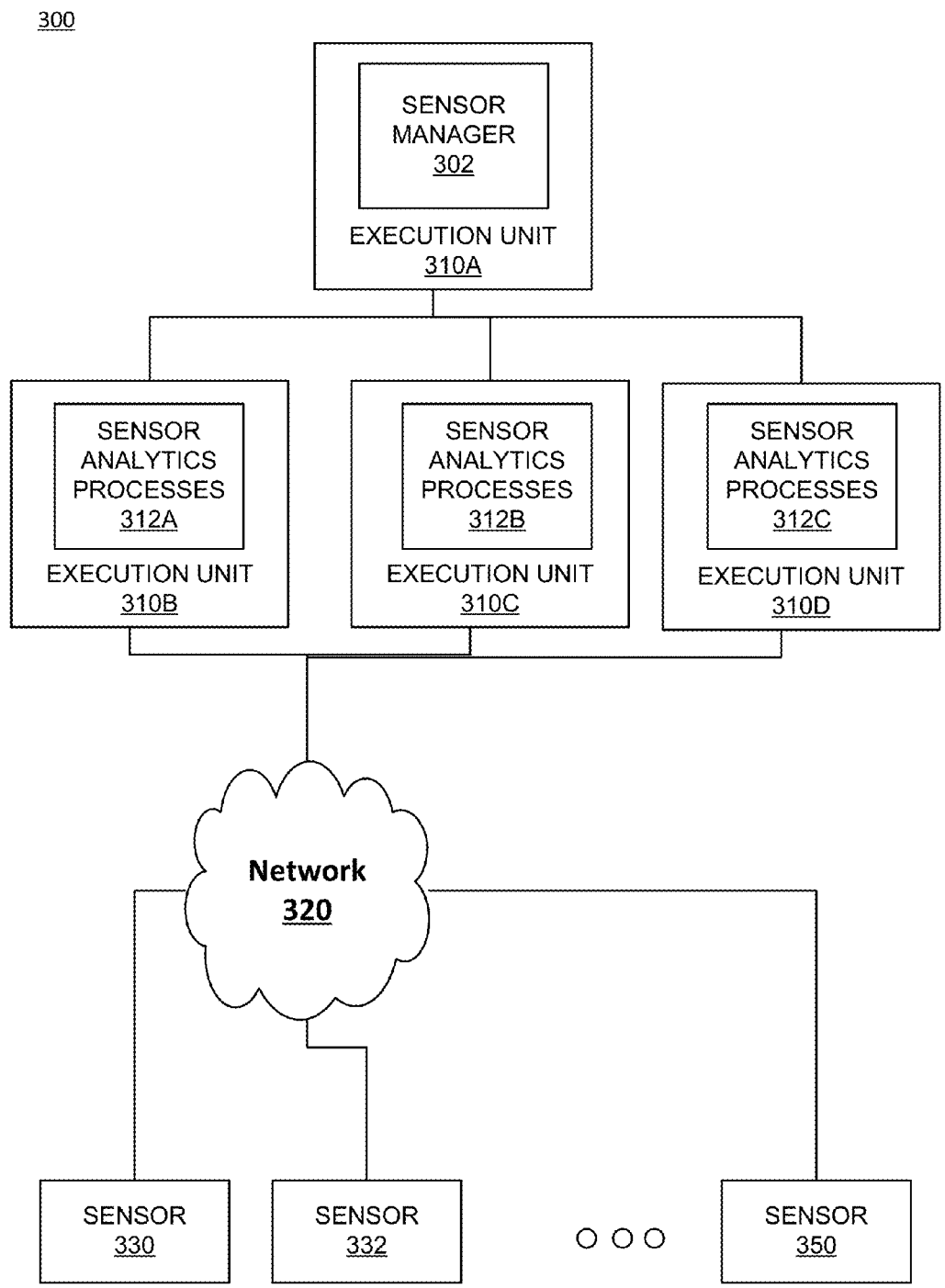
FIG. 3 shows exemplary allocations of sensor analytics processes on execution units in accordance with one embodiment.

FIG. 3 shows exemplary allocations of sensor analytics processes on execution units in accordance with one embodiment. Diagram 300 depicts a sensor manager's 302 allocation and load balancing functionality. Diagram 300 includes execution units 310A-D, a network 320, and sensors 330-350. The sensors 330-350 may be any of a variety of sensors, as described above. The network 320 communicatively couples the execution units 310A-D and the sensors 330-350. The network 320 may be any of a variety of networks or combination thereof as described herein. The sensors 330-350 and execution units 310A-D may be spread out geographically. The sensors 330-350 may send measurements or readings at a specific rate (e.g., every ten seconds). The rate at which the sensors 330-350 may send readings can be configured via the sensor manager 302. The readings may thus include multiple measurements of the sensor.

The execution units 310A-D are configured for executing the sensor manager 302 or sensor analytics processes 312A-C. In some embodiments, the execution units 310A-D may be virtual machines or physical computing systems or some combination thereof. The sensor analytics processes 312A-C may perform various analyses of sensor data, as described above (e.g., as described with respective to FIG. 2). For example, the sensor analytics processes 312A-C may each be 50 sensor analytics processes.

The sensor analytics processes 312A-C may analyze data from a sensor for a particular time interval. It is appreciated that the particular time interval may be modifiable and may be set using a configurable parameter. For example, one of the multiple sensor analytics processes 312A-C may analyze the previous 30 seconds of sensor readings every ten seconds, while another analyzes the previous one minute or one week of sensor readings every two hours.

In some embodiments, each of the sensor analytics processes 312A-C may determine a normalized value associated with a time interval. The sensor analytics processes 312A-C may compare normalized values for each time interval to determine whether to send an alert. For example, for radiation sensors readings with a normalized value from a 30 second period where radioactive material was introduced will be substantially higher than the normalized value of the previous 30 second period. As another example, for radiation sensors readings, the normalized values over a 30 second period may vary slightly when small amounts of radioactive material are slowly accumulated in range of the radiation sensor. When comparing the normalized value of a 30 second interval to a 30 second interval that is 24 hours or several days later, the difference in normalized values will be substantial and the basis for sending an alert. The sensor analytics processes 312A-C in combination with the sensor manager 302 may thus eliminate false positives.

The time intervals of analysis of the sensor analytics process 312 A-C may vary based on location and the respective sensor that each of the sensor analytics processes 312A-C is associated with. For example, one or more the sensor analytics processes 312A-C associated with a warehouse where material is moved in and out once a week may analyze the previous week's sensor readings every ten seconds or at some other frequency. As another example, a high traffic area (e.g., an airport) may have one or more sensor analytics processes 312A-C may analyze the previous one minute or 30 seconds of sensor readings every ten seconds or at some other frequency.

The sensor manager 302 is configured to manage each of the sensor analytics processes 312A-C and ensure that each is operating properly. In some embodiments, proper operation is determined based on a comparison of the expected performance based on the respective configuration parameters of the sensor analytics processes 312A-C to the actual operation of sensor analytics processes 312A-C. For example, if a sensor analytics process, e.g., sensor analytics processes 312B, is configured to perform an analysis every 10 seconds and 60 seconds have passed without any analytics data from the sensor analytics process 312B, then sensor analytics process 312B may be determined to be unhealthy. Accordingly, unhealthy sensor analytics processes, e.g., sensor analytics processes 312B, may be restarted or reconfigured. The sensor manager 302 may further perform automatic recovery of other failed sensor analytics processes.

The sensor manager 302 may further determine a sensor failure based on restarting one or more sensor analytics processes one or more times without receiving sensor analytics data from the restarted sensor analytics processes. The sensor manager 302 may then send a message or other indicator that a sensor has failed (e.g., to a graphical user interface, an email to the operator, SMS message, etc.).

The sensor manager 302 is further configured to allocate sensory analytics processes 312A-C across or over the execution units 310B-D. For example, the sensor manager 302 may determine an allocation of sensory analytics processes 312A-C over executions units 310B-D prior to initiating the sensor analytics processes 312A-C based on the characteristics of execution units 310B-D. These characteristics may include processing power, current computing load, geographic distance, etc.

The sensor manager 302 may further be configured to perform load balancing of the sensor analytics processes 312A-C over or across the execution units 310B-D. For example, if an execution unit, e.g. execution unit 310B is approaching a capacity limit (e.g., processing power, temperature, storage, etc.) the sensor manager 302 may shift some of the sensor analytics processes 312A to another execution unit, e.g. execution unit 310C. In some embodiments, the sensor manager 302 may automatically load balance the sensor analytics processes 312A-C over the execution units 310B-D. The sensor manager 302 may thus perform the functions of a virtualizer.

Figure 4:
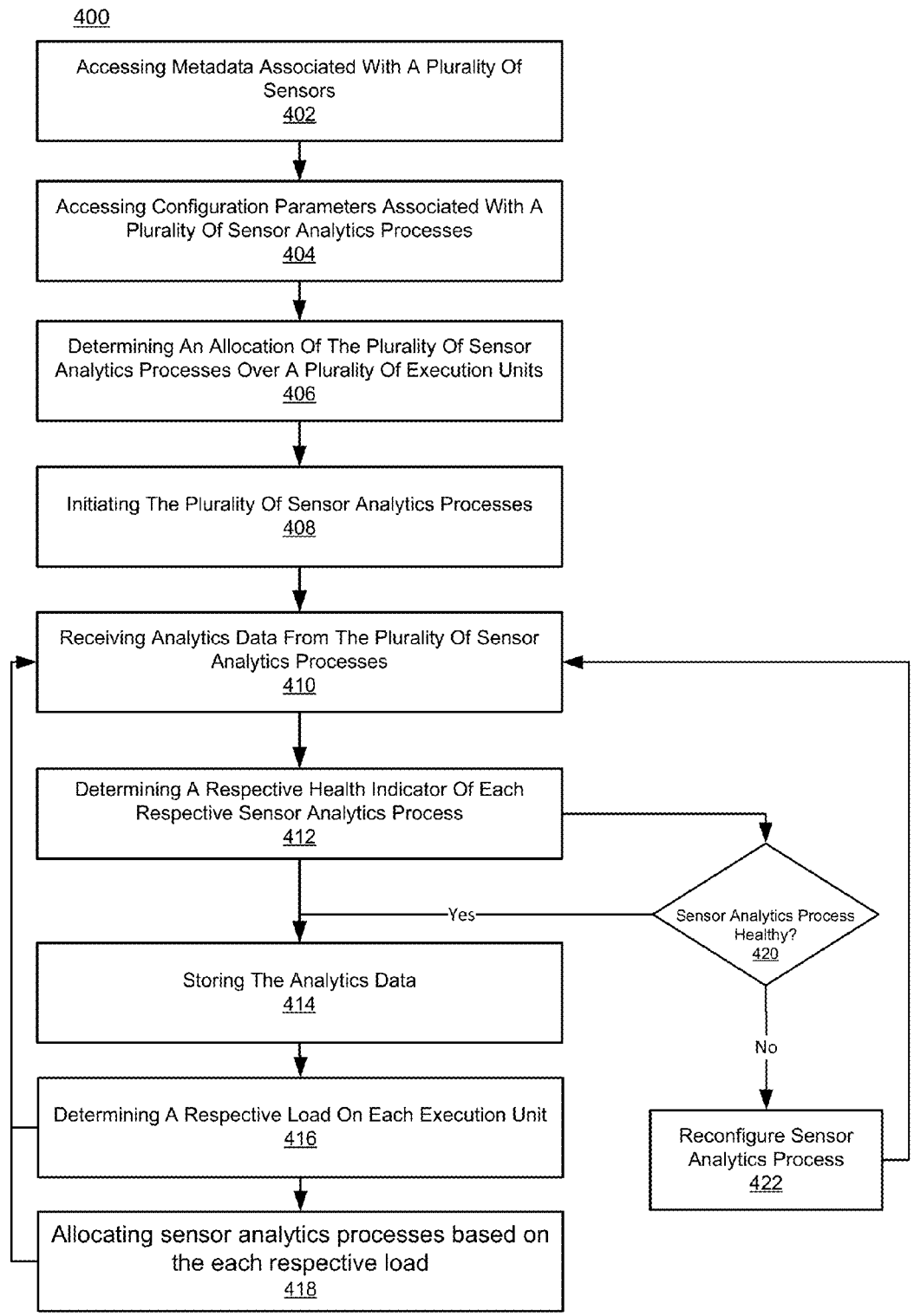
FIG. 4 shows an exemplary flow diagram of a process for managing sensor processes in accordance with one embodiment.

FIG. 4 shows an exemplary flow diagram of a process for managing sensor processes in accordance with one embodiment. Flow diagram 400 depicts a process for initiating sensor analytics processes, managing the execution of the sensor analytics processes (e.g., load balancing), associating metadata with sensor analytics data, and monitoring the health of the sensor analytics processes.

At block 402, the metadata associated with a plurality of sensors is accessed. As described above, the metadata may include a variety of information about each sensor including geographical position, the description of the sensor, description of the sensor type, name of the sensor, etc. In some embodiments, the metadata associated with the plurality of sensors comprises the respective location information, e.g., latitude, longitude, etc., associated with each sensor of the plurality of sensors.

At block 404, a plurality of configuration parameters associated with a plurality of sensor analytics processes is accessed (e.g., in an electronic system).

At block 406, an allocation of the plurality of sensor analytics processes over a plurality of execution units is determined. For example, three sensor analytics processes may be allocated to one execution unit while another execution unit may be allocated with only one sensor analytics process. It is appreciated that each execution unit may be configured to execute one or more of the sensor analytics processes. In some embodiments, the execution units may be virtual machines, as described above.

At block 408, the plurality of sensor analytics processes based on the plurality of configuration parameters is initiated. In some embodiments, each of the plurality of sensor analytics processes is associated with a respective sensor.

At block 410, analytics data from the plurality of sensor analytics processes is received.

At optional block 412, the health indicator of a particular sensor analytics process is determined. The health indicator may be determined based on the respective analytics data received from the sensor analytics process as compared to expected performance based on the respective configuration parameters of the sensor analytics process. The proper operation may be determined based on a comparison of the expected performance based on the respective configuration parameters of the sensor analytics processes to the actual operation of sensor analytics processes. For example, if a sensor analytics process is configured to perform an analysis every 10 seconds and 60 seconds have passed without any analytics data from the sensor analytics process then it may be determined to be unhealthy. Block 420 may then be performed.

At optional block 420, whether each sensor analytics process is healthy is determined based on the respective health indicator of each sensor analytics process as compared to expected performance based on the respective configuration parameters of the sensor analytics process, as described above. For a sensor analytics process having a negative health indicator, block 422 may optionally be performed.

At optional block 422, a sensor analytics process is reconfigured. For sensor analytics process with a negative health indicator, the sensor analytics process may be reconfigured by restarting the sensor analytics process or replacing the sensor analytics process with a new sensor analytics process.

At block 414, the analytics data from the plurality of sensor analytics processes is stored. In some embodiments, the analytics data is stored in a data warehouse. The stored analytics data may be used to determine a state change in a respective sensor processes'. In some embodiments, the analytics data associated with each of the plurality of sensor analytics processes is stored with a respective portion of the metadata associated with a respective sensor.

At block 416, the load on each execution unit of a plurality of execution units is determined. As described above, the load may be the processing load of an execution unit (e.g., virtual machine or computing system). If the load on each of the plurality of execution units is within normal operating parameters (e.g., an execution unit is not being overloaded or sensor analytics performance suffering), block 410 may then be performed.

At block 418, the sensor analytics processes are allocated based on the load of each execution unit of the plurality of execution units. As described above, load balancing may be performed to allocate the sensor analytics processes over the execution units.

Figure 5:
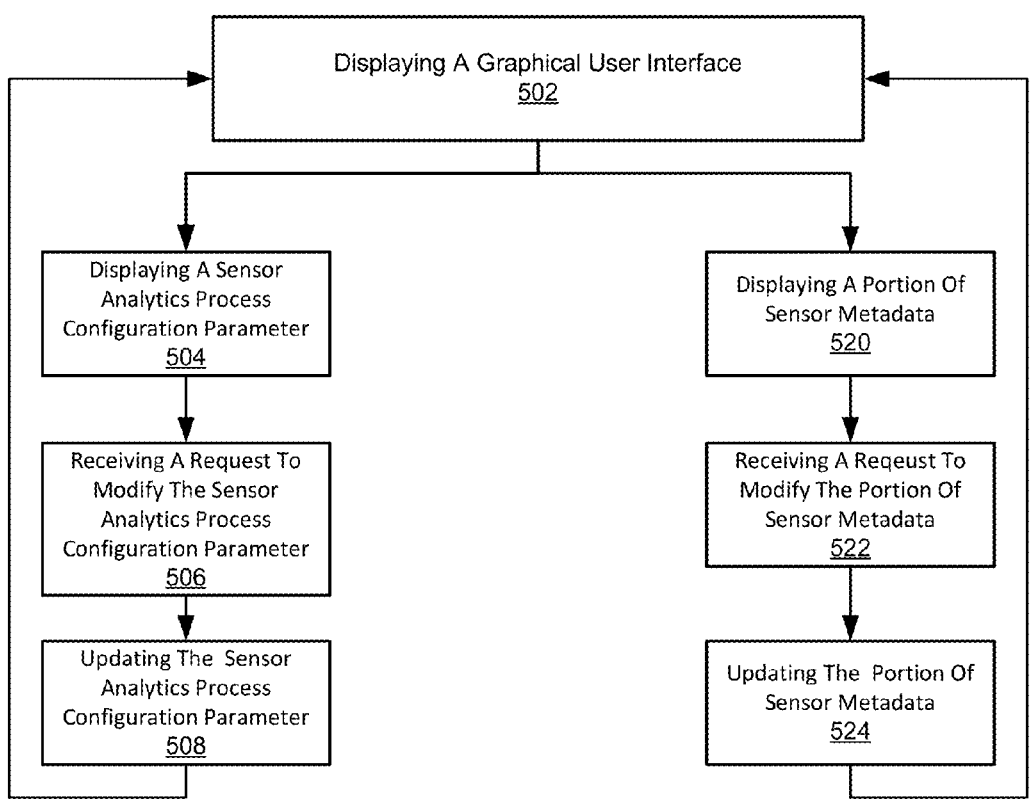
FIG. 5 shows an exemplary flow diagram of a process for managing sensor process parameters and metadata in accordance with one embodiment.

FIG. 5 shows an exemplary flow diagram of a process for managing sensor process parameters and metadata in accordance with one embodiment. Flow diagram 500 depicts a process for using a graphical user interface to display and manage sensor metadata and sensor analytic process configuration parameters.

At block 502, a graphical user interface is displayed. The graphical user interface may be displayed upon login into a sensor management system.

At block 504, a configuration parameter associated with a particular sensor analytics process is displayed in a graphical user interface.

At block 506, a request to modify a configuration parameter of a sensor analytics process is received. The request may be to add, change, or remove a value for the configuration parameter of the sensor analytics process.

At block 508, the requested configuration parameter is updated. Block 502 may then be performed.

At block 520, a portion of the metadata associated with the plurality of sensors in a graphical user interface is displayed.

At block 522, a request to modify a portion of the metadata associated with one sensor of the plurality of sensors is received. The request may be to add, change, or remove one or more values associated with the portion of metadata associated with the respective sensor of the plurality of sensors.

At block 524, the requested portion of metadata is updated. Block 502 may then be performed.

Figure 6:
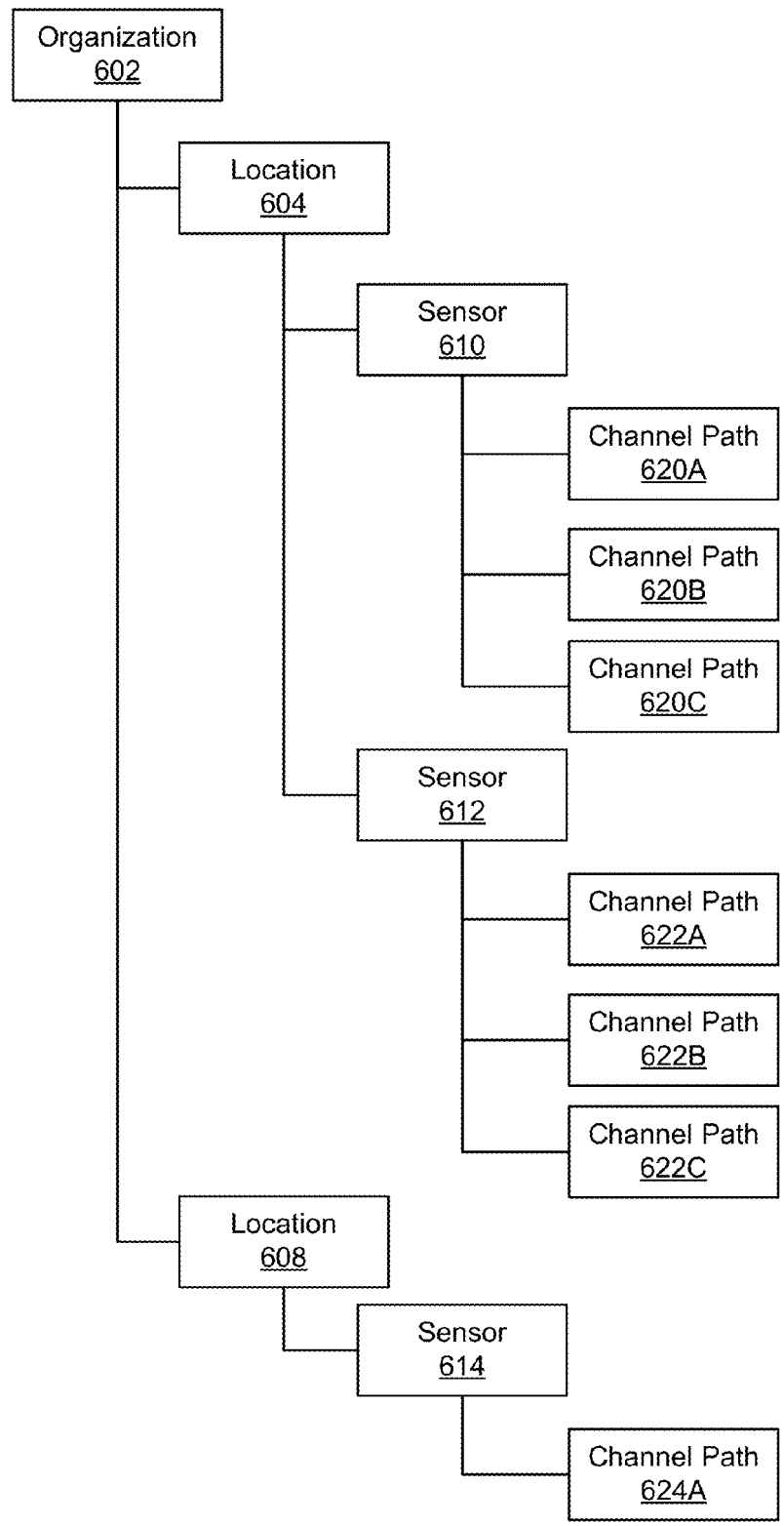
FIG. 6 shows a block diagram of an exemplary sensor management hierarchy in accordance with one embodiment.

FIG. 6 shows a block diagram of an exemplary sensor management hierarchy in accordance with one embodiment. Diagram 600 depicts an exemplary organizational hierarchy of sensor management data. Diagram 600 includes organization 602. Organization 602 may be any of a variety of entities (e.g., airport, shipping yard, public venue, business, etc.), as described herein.

Organization 602 includes locations 604 and 608, which may be associated with physical locations at an organization e.g., gates at a terminal of an airport. Location 604 includes sensor 610 and sensor 612. Location 608 includes sensor 614. Locations 604 and 608 may include additional or fewer sensors and the number of sensors shown are for illustrative purposes only and should not be construed limiting the scope of the embodiments.

The sensors 610 and 612 may be any of a variety of sensors, as described herein. Sensor 610 has associated channel paths 620A-C. Sensor 612 has associated channel paths 622A-C. Sensor 614 has associated channel path 624A. The channel paths 620A-C, 622A-C, and 624A may be varying time scales or time intervals over which data from the sensors 610, 612, and 614, respectively, are analyzed. Sensors 610, 612, and 614 may have additional or fewer associated channel paths (e.g., based on configuration).

Figure 7:
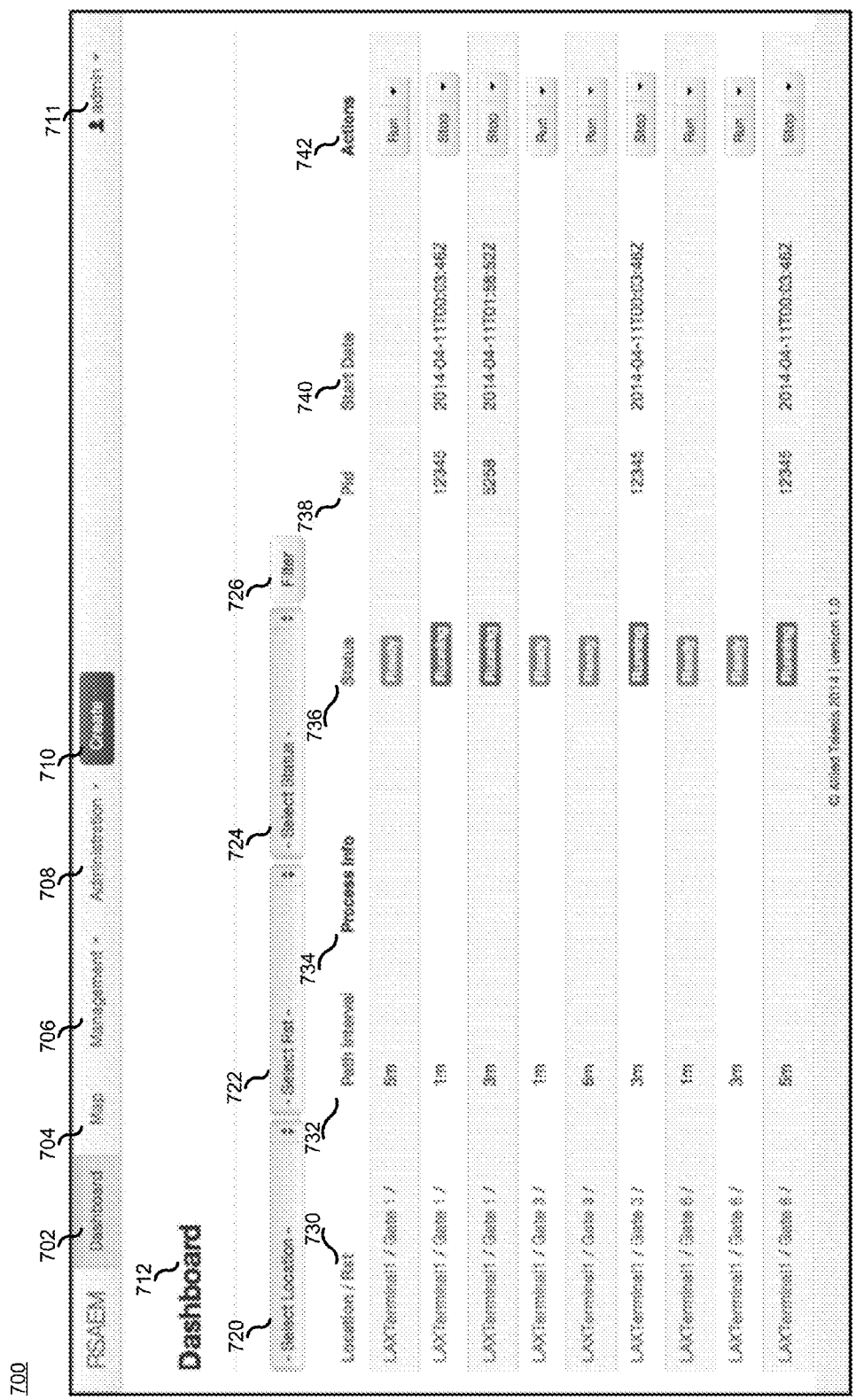
FIG. 7 shows a block diagram of an exemplary graphical user interface configured for displaying an overview of the configured locations, sensors, and channels paths in accordance with one embodiment.

FIG. 7 shows a block diagram of an exemplary graphical user interface configured for displaying an overview of the configured locations, sensors, and channels paths in accordance with one embodiment. The exemplary graphical user interface 700 is configured to display an overview of each configured location, sensor, and channel path. The exemplary graphical user interface 700 may display information about the operational status of each channel path (e.g., Running, Starting, Stopped, etc.). The exemplary graphical user interface 700 further shows the Process ID (Pid) and the data/time when a channel path was started. The exemplary graphical user interface 700 is further configured for accessing of common functions on the channel paths including, but not limited to, Stop, Run, View Chunk History, and View Error History.

In some embodiments, the exemplary graphical user interface 700 includes a dashboard button 702, a map button 704, a management menu 706, an administration menu 708, a create button 710, and a user icon 711. The dashboard button 702 is operable for invoking display of a dashboard display as shown in FIG. 7. The map button 704 is operable for invoking a map display of representations of the sensors on a map (e.g., FIG. 20). The management menu 906 is operable for invoking display of a management menu which may include an organization menu item (e.g., for accessing the graphical user interface (GUI) of FIG. 10), a location menu item (e.g., for accessing the GUI of FIG. 11), a sensor menu item (e.g., for accessing the GUI of FIG. 17), and a process configuration menu item (e.g., for accessing the GUI of FIGS. 21-22). The administration menu 708 is operable for invoking display of an administration menu for accessing sensor management functions. The create button 710 is operable for creating a new sensor management configuration. The user icon 711 is configured for accessing user associated functions (e.g., logout, preferences, etc.).

The exemplary graphical user interface 700 may further include a dashboard label 712, a location drop down 720, a sensor drop down 722, a status drop down 724, and a filter button 726. The location drop down 720 allows selection of a location. The sensor drop down 722 allows selection of a particular sensor. The status drop down 724 drop down allows selection of a status of a channel path (e.g., Running, Starting, Stopped, etc.). The filter button 726 allows filtering of the locations, sensors, and channel paths that are displayed in the exemplary graphical user interface 700.

The location/sensor column 730 displays locations and associated sensor locations. The path interval column 732 displays channel path time intervals. The process information column 734 displays information associated with the sensor process. The status column 736 displays the status associated with a sensor analytics process or channel path. The Pid column 738 shows the process ID of the channel path or sensor analytics process. The start data column 940 displays the start date and time when a sensor analytics process or channel path began running. The actions column 742 is configured to allow one to change the status of a channel path (e.g., Running, Starting, Stopped, etc.).

It is appreciated that the use and description of the GUI having a dropdown menu is exemplary and not intended to limit the scope of the embodiments. For example, a pop-up window, a combo-box, a text box, a list box, a checkbox, etc., or any combination thereof may be used.

Figure 8:
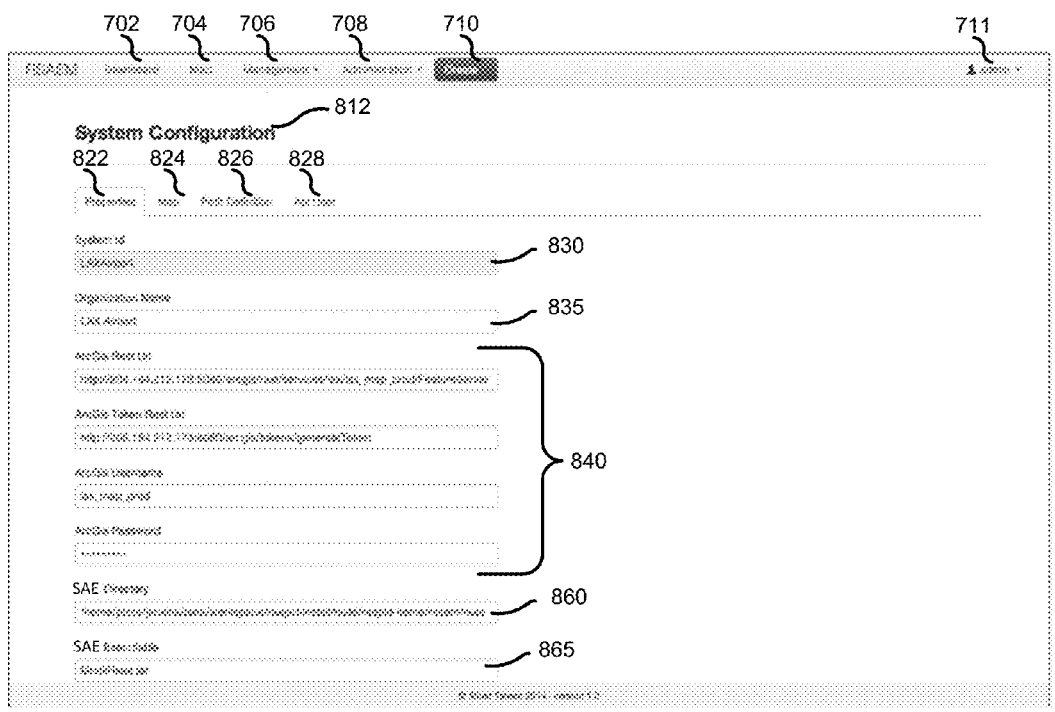
FIG. 8 shows a block diagram of an exemplary graphical user interface configured for configuring system wide settings in accordance with one embodiment.

FIG. 8 shows a block diagram of an exemplary graphical user interface for configuring system wide settings in accordance with one embodiment. System wide settings are configured via an exemplary graphical user interface 800. In some embodiments, properties can be set or edited for the sensor based detection system to execute. Elements of the exemplary graphical user interface 800 having the same reference numerals as exemplary graphical user interface 700 may perform substantially similar functions as described herein with respect to exemplary graphical user interface 700.

The exemplary graphical user interface 800 includes a system configuration label 812, a properties tab 822, a map tab 824, a path definition tab 826, and an API user tab 828. The system configuration label 812 indicates that a system configuration page for configuring and viewing of system wide settings is being displayed. The properties tab 822 allows configuration of system wide settings. The map tab 824 is configured to invoke the display of system components (e.g., sensors) in a geographical context (e.g., on a map). The path definition tab 826 is configured to define channel paths or time intervals of the sensor analytics processes. The API user tab 828 is configured to access the application programming interfaces (APIs).

In some embodiments, the properties tab 822 includes a system Id 830, an organization name 835, a geo-location configuration setting 840, a sensor analytics engine process location 860, and a sensor analytics executable area 865. The system Id tab 830 allows setting a system Id (e.g., LAXAirport). The organization name 835 tab allows setting an organization name (e.g., LAX Airport). The geo-location configuration settings tab 840 allows setting the geo-location service or server destination (e.g., uniform resource identifiers (URIs) and login information) on each sensor. The sensor analytics engine process location 860 allows configuration of the directory or folder where the sensor analytics process executable is stored. The sensor analytics executable area 865 allows configuration of the name of the sensor analytic process executable file (e.g., execfile.jar, execfile.exe, etc.).

Figure 9:
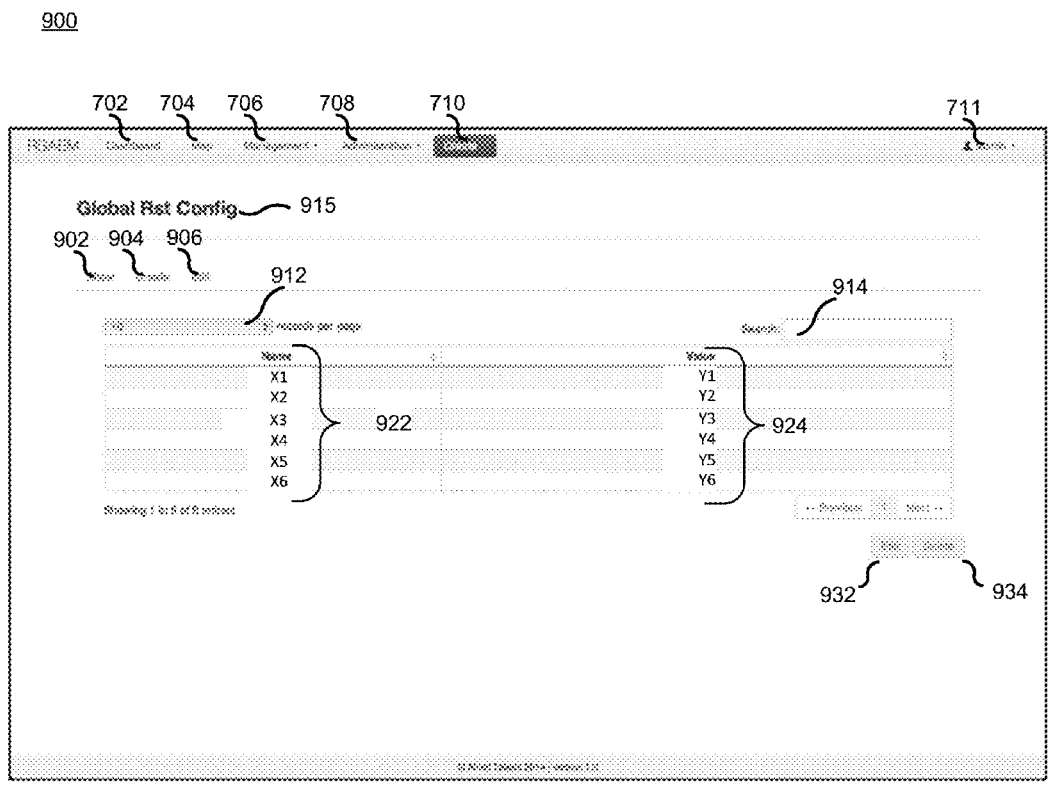
FIG. 9 shows a block diagram of an exemplary graphical user interface configured for configuration of sensor metadata in accordance with one embodiment.

FIG. 9 shows a block diagram of an exemplary graphical user interface configured for configuration of sensor metadata in accordance with one embodiment.

The exemplary graphical user interface 900 is operable for configuring global properties of the sensor analytic engine processes. In some embodiments, exemplary graphical user interface 900 is accessed via an administration global sensor configuration menu item. The exemplary graphical user interface 900 allows for setting global properties for sensor analytics processes, which are shared by all the sensor analytic processes that are executing on one system.

Exemplary graphical user interface 900 includes a global sensor configuration label 915, a show tab 902, a create tab 904, and an edit tab 906. The global sensor configuration label 915 indicates that a global sensor configuration interface is being displayed. The show tab 902 invokes the display of properties of (or information pertaining to) sensor analytics processes. The create tab 904 invokes the display of an interface for adding a new property (e.g., global property). The edit tab 906 invokes display an interface for editing an existing property.

The exemplary graphical user interface 900 may further include a records per page drop down 912, a search bar 914, a properties list 922, a values list 924, an edit button 932, and a delete button 934. The records per page drop down menu 912 is configured to set the number of properties to be displayed per page. The search bar 914 is configured to invoke a search of the properties of the sensory analytics processes. The properties list 922 shows the names of the properties (e.g., x1-x6) of the sensor analytics processes. The values list 924 shows the values (e.g., y1-y6) of the respective properties of the sensory analytics processes. For example, the properties 922 may include the width, height, data type, sensor manufacturer, sensor model, and a system identifier. The edit button 932 is configured to edit the value of a property of the sensor analytics processes. The delete button 934 is configured to delete a property of the sensor analytics processes.

Elements of the exemplary graphical user interface 900 having the same reference numerals as exemplary graphical user interface 700 may perform substantially similar functions as described herein with respect to exemplary graphical user interface 700.

Figure 10:
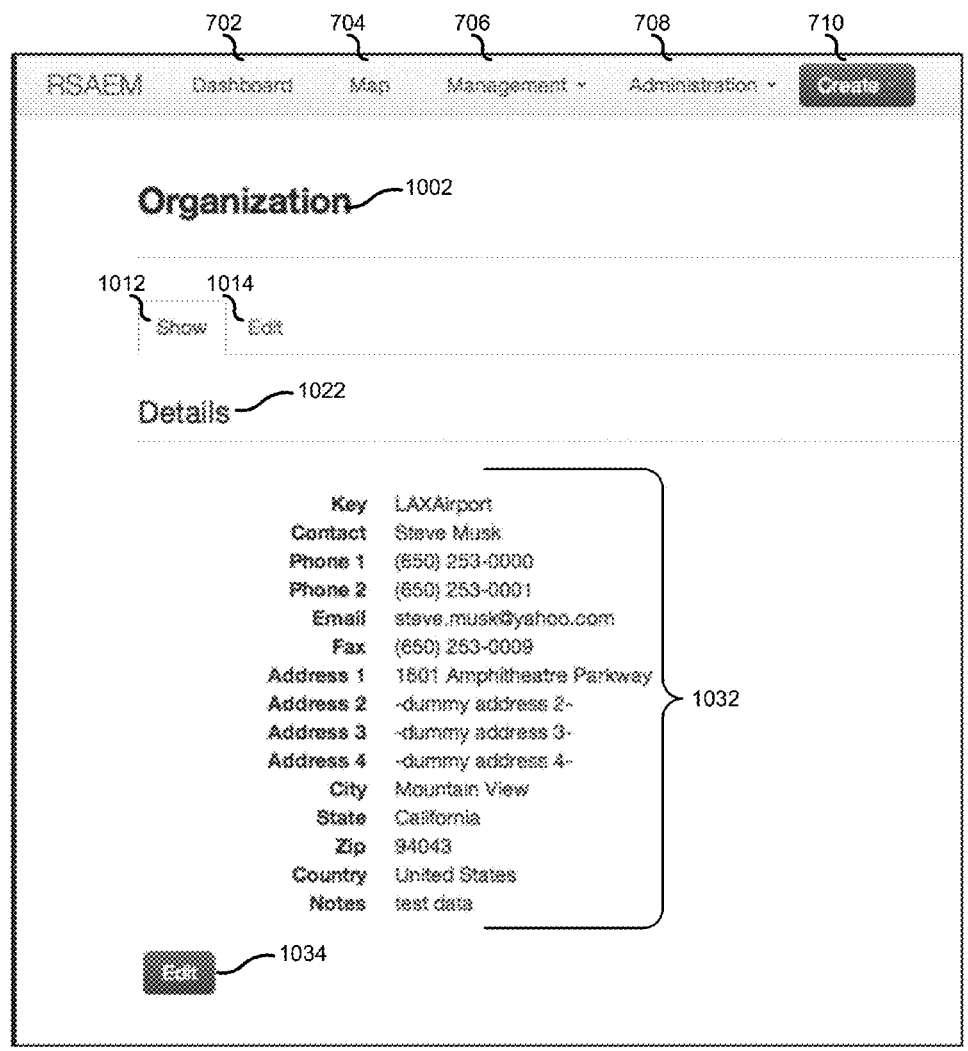
FIG. 10 shows a block diagram of an exemplary graphical user interface operable for viewing and configuring information pertaining to an organization in accordance with one embodiment.

FIG. 10 shows a block diagram of an exemplary graphical user interface operable for viewing and configuring information pertaining to an organization in accordance with one embodiment. The exemplary graphical user interface 1000 includes an organization label 1002, a show tab 1012, an edit tab 1014, a details label 1022, a list of organization details 1032, and an edit button 1034. The exemplary graphical user interface 1000 may be accessed through a management organization menu item (e.g., via management menu 706).

The organization label 1002 indicates that organization details are being displayed. The show tab 1012 is configured for showing organization details (e.g., organization details 1032). The edit tab 1014 is configured to edit the values of the organization details. The details label 1022 indicates that details are being displayed. The organization details 1032 are the configured organization details (e.g., displayed proximate to associated labels). Edit button 1034 is configured for invoking editing of the values of the organization details. In some embodiments, a sensor manager may only have one associated organization (e.g., to simply management of a single organization with a centralized manager). In some embodiments, a sensor manager may be associated with multiple organizations.

Elements of the exemplary graphical user interface 1000 having the same reference numerals as exemplary graphical user interface 700 may perform substantially similar functions as described herein with respect to exemplary graphical user interface 700.

Figure 11:
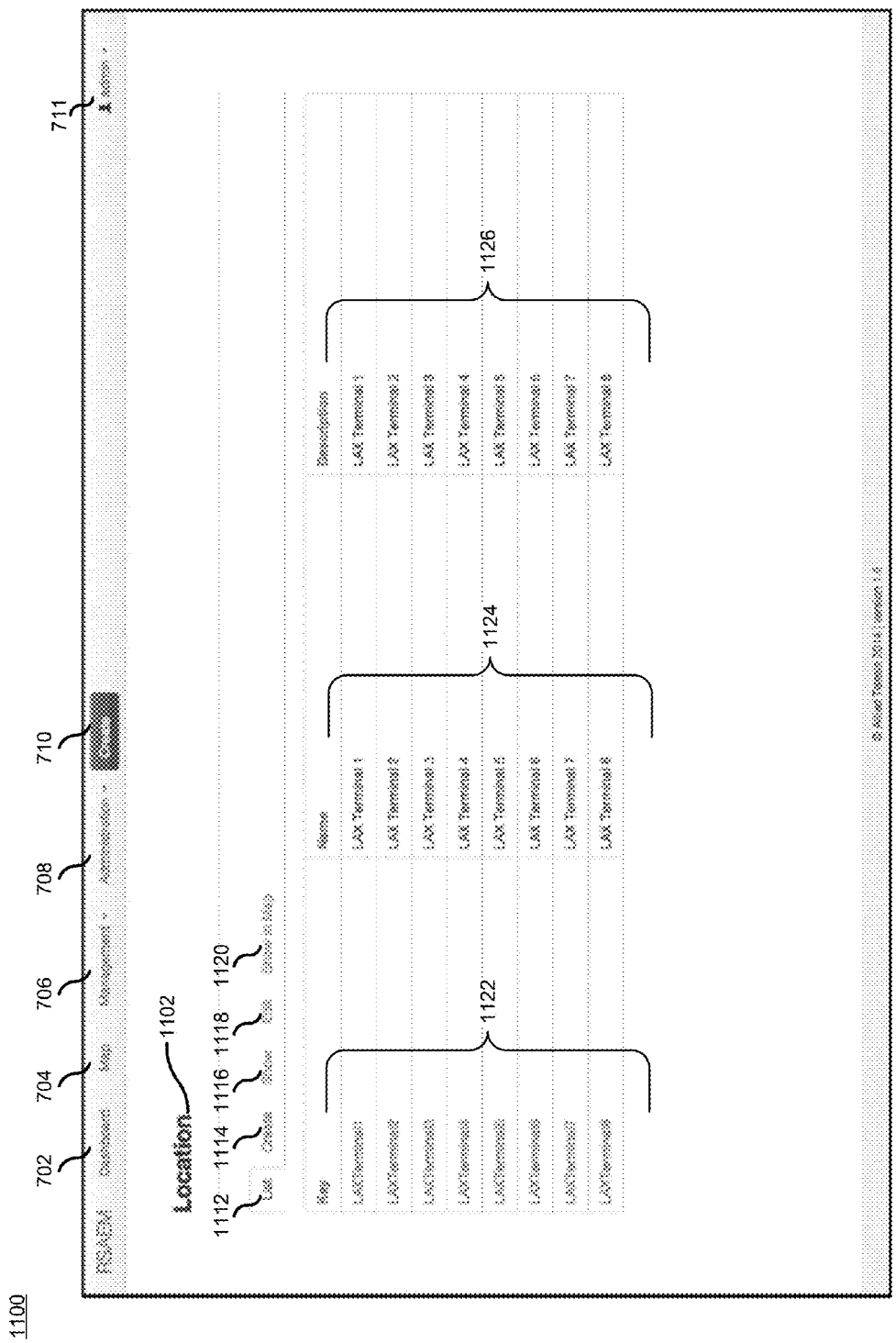
FIG. 11 shows a block diagram of an exemplary graphical user interface configured for displaying a plurality of locations associated with one or more sensors in accordance with one embodiment.

FIG. 11 shows a block diagram of an exemplary graphical user interface configured for displaying a plurality of locations associated with one or more sensors in accordance with one embodiment. The exemplary graphical user interface 1100 is configured for adding locations of a sensor management system. Exemplary graphical user interface 1100 includes a location label 1102, a list tab 1112, a create tab 1114, a show tab 1116, an edit tab 1118, and a show in map tab 1120.

The location label 1102 indicates that the locations of the sensor based detection system are being displayed. The list tab 1112 invokes the display of a list of configured locations. The create tab 1114 is configured to create or add locations to a sensor management system. The show tab 1116 is configured to show locations that have been added to a sensor management system. The edit tab 1118 is configured to edit the location information. The show in map tab 1120 is configured to show a location in a geographical context (e.g., on a map).

The exemplary graphical user interface 1100 further includes location keys 1122, location names 1124, and location descriptions 1126. The location keys 1132 may be unique identifiers for locations, which may be selectable to view the details of each location. The location names 1124 are the names each respective location. The location descriptions 1126 are the descriptions associated with each respective location.

Elements of the exemplary graphical user interface 1100 having the same reference numerals as exemplary graphical user interface 700 may perform substantially similar functions as described herein with respect to exemplary graphical user interface 700.

Figure 12:
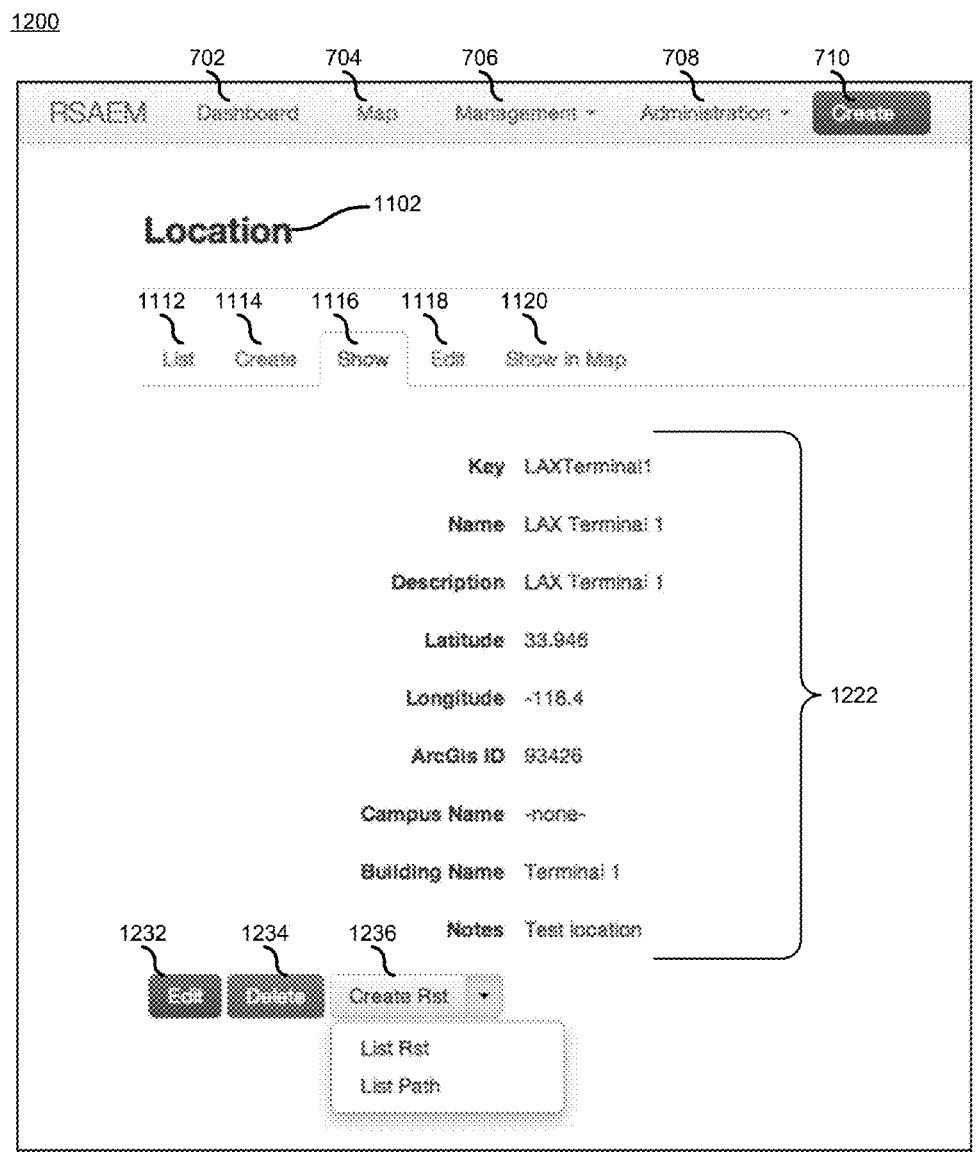
FIG. 12 shows a block diagram of an exemplary graphical user interface configured for displaying information about a particular location associated with one or more sensors in accordance with one embodiment.

FIG. 12 shows a block diagram of an exemplary graphical user interface configured for displaying information about a particular location associated with one or more sensors in accordance with one embodiment. The exemplary graphical user interface 1200 includes location information 1222, an edit button 1232, a delete button 1234, and a drop down menu 1236. The exemplary graphical user interface 1200 is configured to display the current configuration of a location and listing of the sensors and channels paths for that location.

The location information 1222 includes information about the location currently being displayed. The edit button 1232 is configured to edit the information for the currently displayed location (e.g., FIG. 13). The delete button 1234 is configured to delete the currently displayed location. The drop down menu 1236 is configured to create a sensor entry associated with the location currently being displayed, invoking display of a list of sensors and channel paths associated with the location.

Elements of the exemplary graphical user interface 1200 having the same reference numerals as in exemplary graphical user interface 700 and exemplary graphical user interface 1100 may perform substantially similar functions as described herein with respect to exemplary graphical user interface 700 and exemplary graphical user interface 1100.

Figure 13:
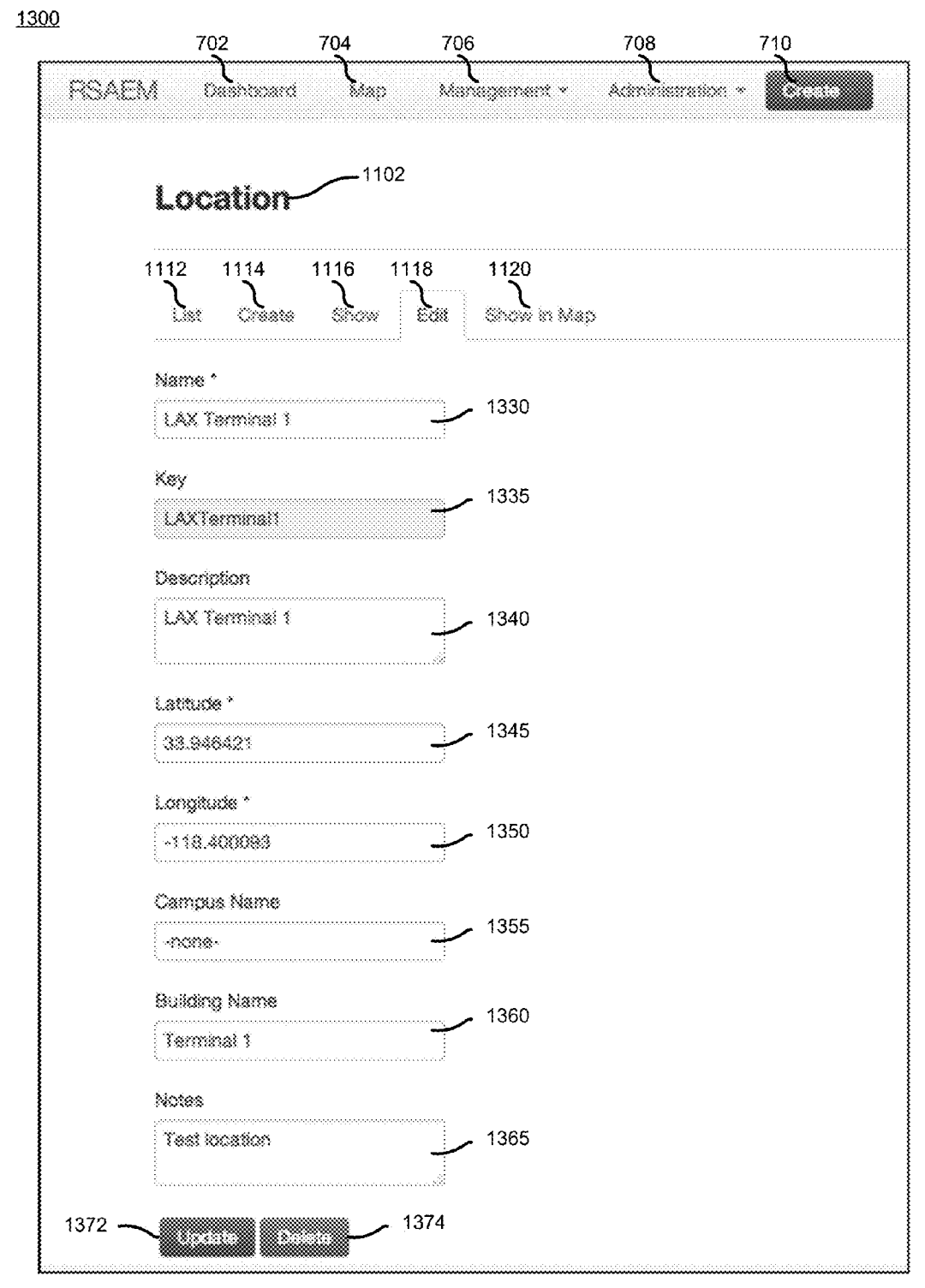

FIG. 13 shows a block diagram of an exemplary graphical user interface configured for editing of location information associated with one or more sensors in accordance with one embodiment. The exemplary graphical user interface 1300 includes a name field 1330, a key field 1335, a description field 1340, a latitude field 1345, a longitude field 1350, a campus name field 1355, a building name field 1360, a notes field 1365, an update button 1372, and a delete button 1374.

Name field 1330 displays the name of the location and may allow editing of the name of a location. Key field 1335 displays the key of the location. In some embodiments, key field 1335 allows editing of the key or identifier. In some embodiments, key field 1335 is automatically configured by the sensor manager. In some embodiments, the sensor manager may also associate an ID which uniquely identifies a location to a geo-positioning service, which may facilitate the location being displayed in a geographical context (e.g., FIG. 14).

Description field 1340 is configured for displaying and may allow editing of the description associated with a location. Latitude field 1345 is configured for displaying and may allow editing of the latitude associated with a location. Longitude field 1350 is configured for displaying and may allow editing of the longitude associated with a location. Campus name field 1355 is configured for displaying and may allow editing of the campus name associated with a location. The building name field 1360 is configured for displaying and may allow editing of the building name associated with a location. Notes field 1365 is configured for displaying and may allow editing of the notes associated with a location. The update button 1372 is configured for updating location information based on the information entered into items 1330-1365. The delete button 1374 is configured to delete a location.

Elements of the exemplary graphical user interface 1300 having the same reference numerals as in exemplary graphical user interface 700 and exemplary graphical user interface 1100 may perform substantially similar functions as described herein with respect to exemplary graphical user interface 700 and exemplary graphical user interface 1100.

Figure 14:
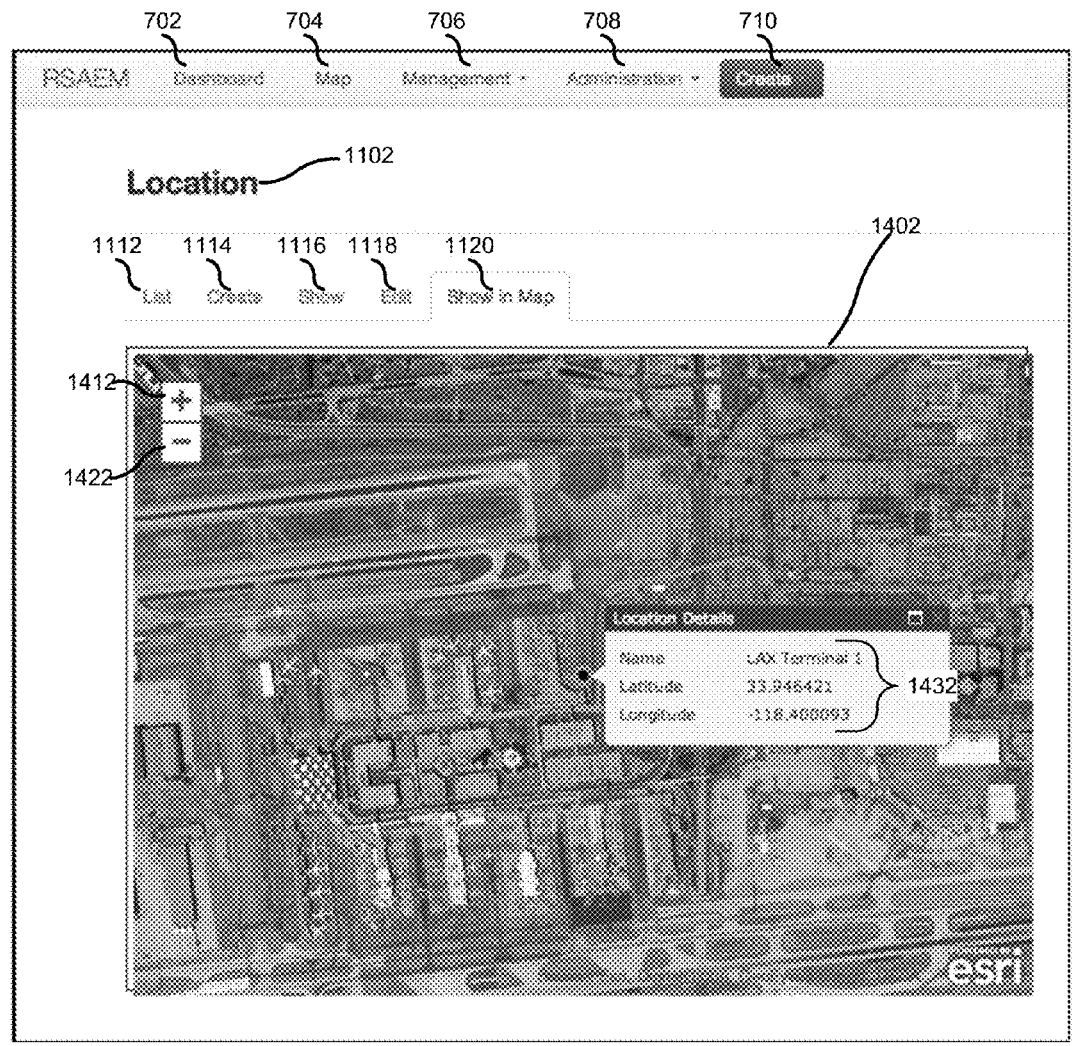
FIG. 14 shows a block diagram of an exemplary graphical user interface configured for showing a location associated with one or more sensors in a geographical context in accordance with one embodiment.

FIG. 14 shows a block diagram of an exemplary graphical user interface configured for showing a location associated with one or more sensors in a geographical context in accordance with one embodiment. The exemplary graphical user interface 1400 includes a map 1402, a location details area 1432, a zoom in button 1412, and a zoom out button 1422.

The map 1402 displays a map that includes an indicator of a location of a sensor. The location details area 1432 displays location details (e.g., name, latitude, longitude, etc.) associated with the sensor location displayed in map 1402. The zoom in button 1412 and the zoom out button 1422 are configured for zooming in or zooming out on map 1402, respectively.

Elements of the exemplary graphical user interface 1400 having the same reference numerals as in exemplary graphical user interface 700 and exemplary graphical user interface 1100 may perform substantially similar functions as described herein with respect to exemplary graphical user interface 700 and exemplary graphical user interface 1100.

Figure 15:
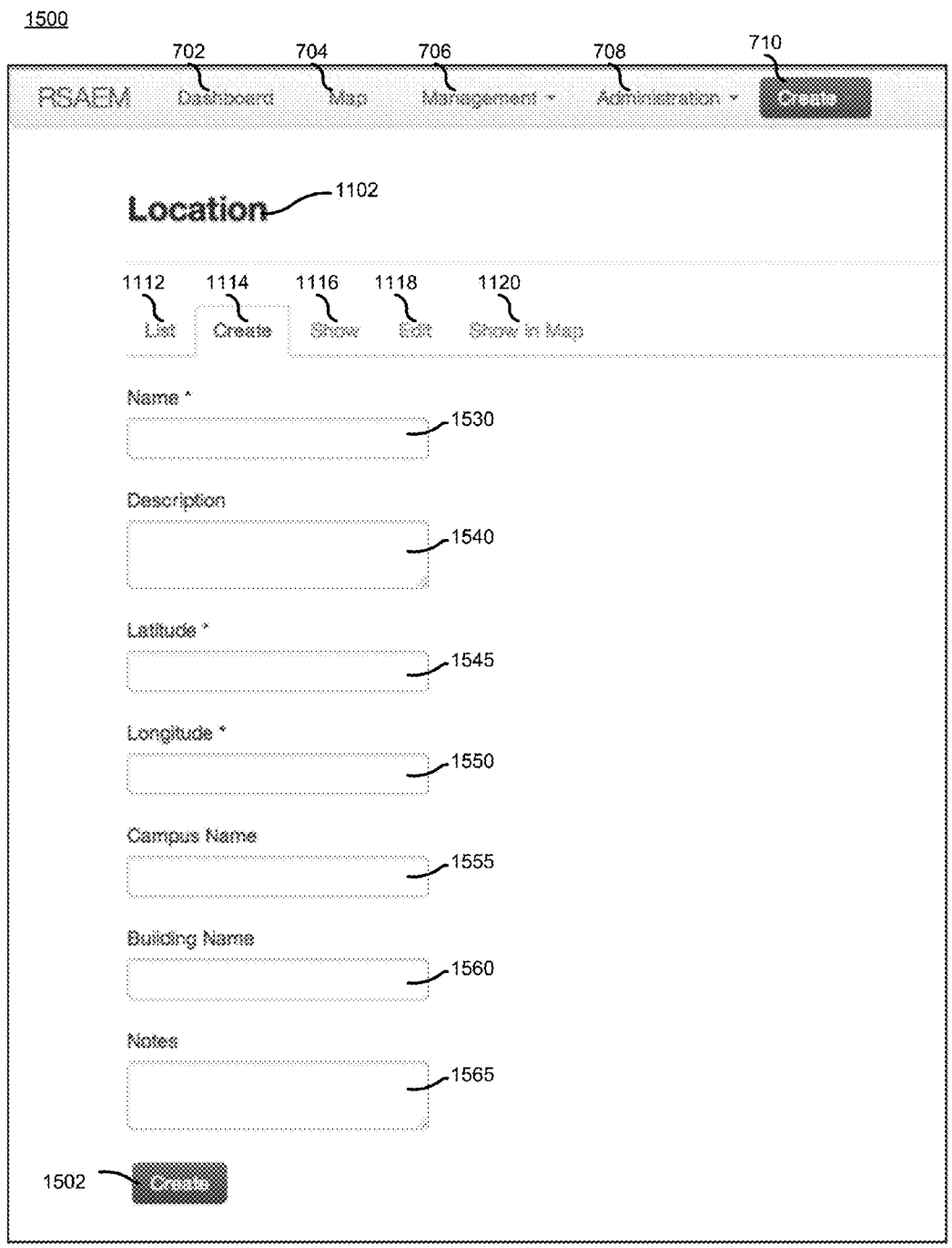
FIG. 15 shows a block diagram of an exemplary graphical user interface configured for configuring a new location to be associated with one or more sensors in accordance with one embodiment.

FIG. 15 shows a block diagram of an exemplary graphical user interface for configuring a new location to be associated with one or more sensors in accordance with one embodiment. The exemplary graphical user interface 1500 depicts display of a create tab configured for creation of a new location. The exemplary graphical user interface 1500 includes a name field 1530, a description field 1540, a latitude field 1545, a longitude field 1550, a campus name field 1555, a building name field 1560, a notes field 1565, and a create button 1502.

The name field 1530 is configured for entering the name of a location to be associated with one or more sensors. The description field 1540 is configured for entering a description to be associated with a location to be associated with one or more sensors. The latitude 1545 and longitude 1550 fields are configured for entering the latitude and longitude to be associated with a location that may have one or more sensors, respectively. The campus name field 1555 is configured for entering a campus name to be associated with a location that may have one or more sensors. The building name area 1560 is configured for entering a building name to be associated with a location that may have one or more sensors. The notes field 1565 is configured for entering and editing of notes associated with a location that may have one or more sensors. The create button 1502 is configured to create a new location entry based on the information entered into elements 1530-1565. After a new location is created is may be displayed on the location list tab (e.g., via selection of list tab 1112).

Elements of the exemplary graphical user interface 1500 having the same reference numerals as in exemplary graphical user interface 700 and exemplary graphical user interface 1100 may perform substantially similar functions as described herein with respect to exemplary graphical user interface 700 and exemplary graphical user interface 1100.

Figure 16:
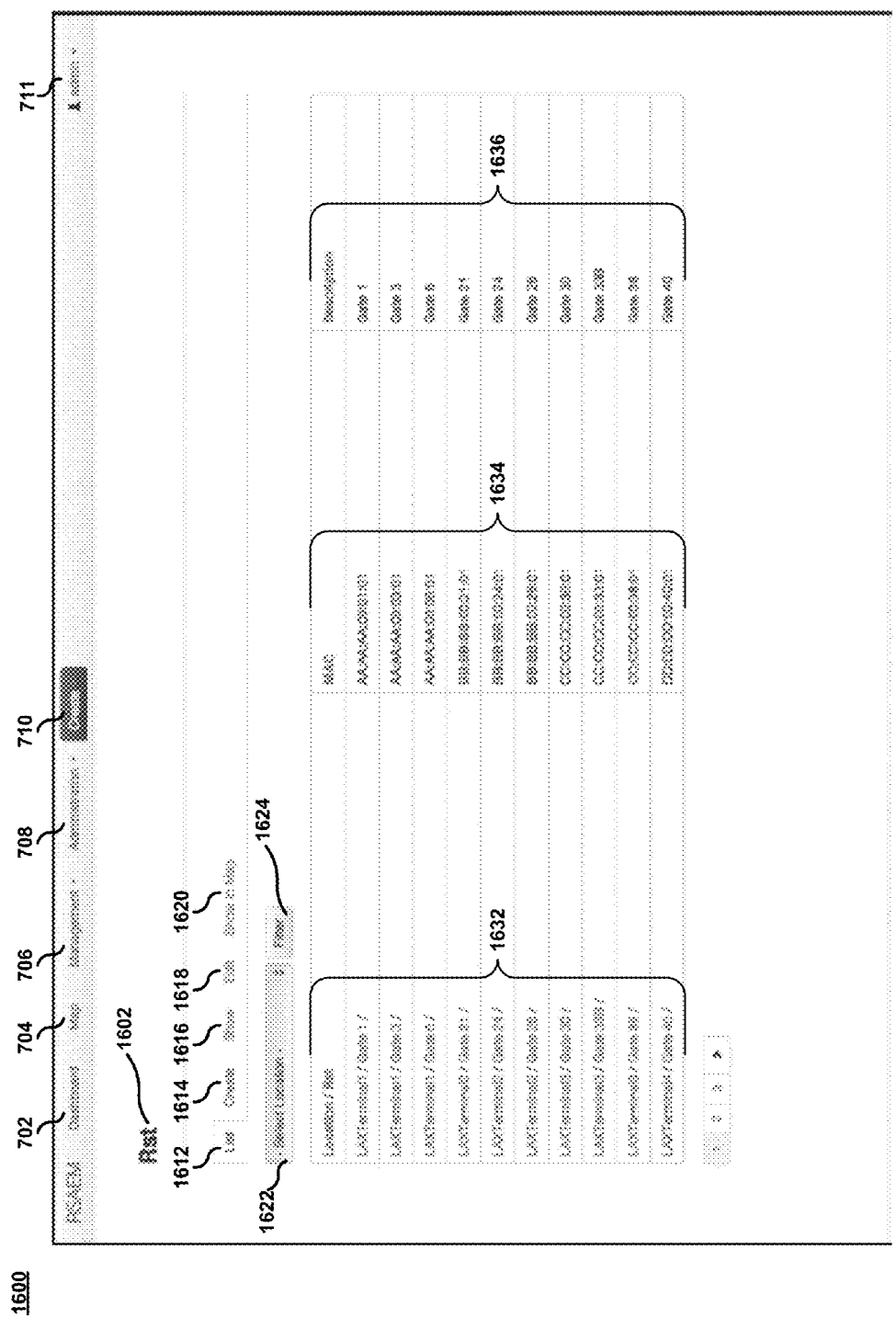
FIG. 16 shows a block diagram of an exemplary graphical user interface configured for displaying a list of sensors in accordance with one embodiment.

FIG. 16 shows a block diagram of an exemplary graphical user interface configured for displaying list of sensors in accordance with one embodiment. The exemplary graphical user interface 1600 depicts a list of sensors. In some embodiments the exemplary graphical user interface 1600 is displayed after configuration of a location and may be configured for adding sensors to the location.

The exemplary graphical user interface 1600 includes sensor label 1602, a list tab 1612, a create tab 1614, a show tab 1616, an edit tab 1618, and a show in map tab 1620. The location label 1602 indicates that the sensors of the based detection system are being displayed. The list tab 1612 is configured to display a list of sensors. The create tab 1614 is configured to create or add sensors to a sensor management system. The show tab 1616 is configured to show sensors that have been added to a sensor management system. The edit tab 1618 is configured to edit sensor information. The show in map tab 1620 is configured to show a sensor location in a geographical context (e.g., on a map).

The exemplary graphical user interface 1600 further includes a drop down list 1622, a filter button 1624, a locations list 1632, a MAC (Media Access Control address) information 1634, and description information 1636.

The drop down list 1622 selects from a list of locations of sensors and the filter button 1624 filters the sensors based on the selected location. The locations list 1632 is configured to show a list of locations and sensors within a sensor management system. The MAC (Media Access Control address) information 1634 is configured to show the respective MAC addresses of the sensors. The description information 1636 is configured to show the respective descriptions associated with each of the sensors.

Elements of the exemplary graphical user interface 1600 having the same reference numerals as exemplary graphical user interface 700 may perform substantially similar functions as described herein with respect to exemplary graphical user interface 700.

Figure 17:
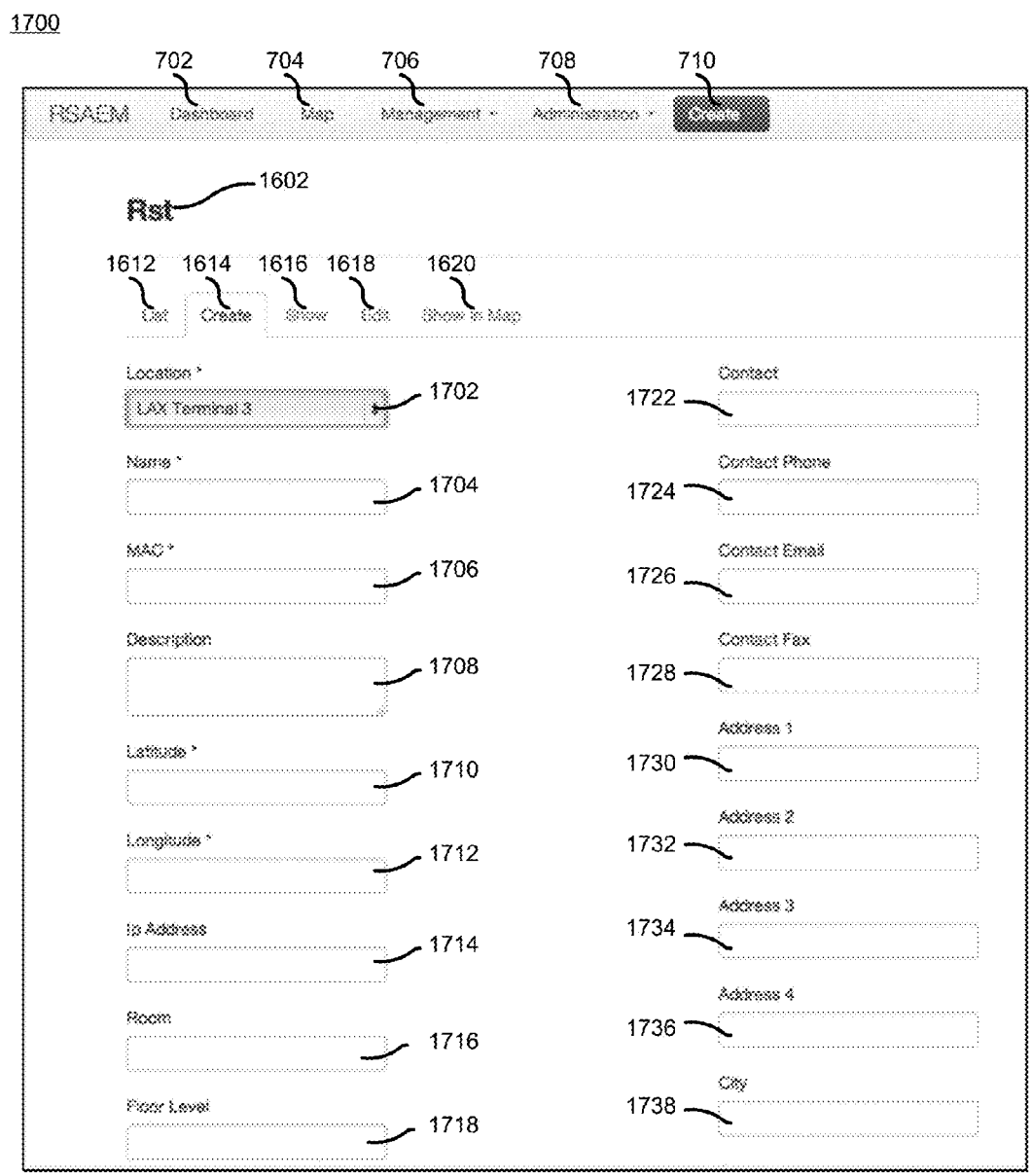
FIG. 17 shows a block diagram of an exemplary graphical user interface configured for creating an entry for a sensor in accordance with one embodiment.

FIG. 17 shows a block diagram of an exemplary graphical user interface configured to create an entry for a sensor in accordance with one embodiment. The exemplary graphical user interface 1700 includes a location field 1702, name field 1704, MAC address field 1706, description field 1708, latitude 1710 and a longitude field 1712, an IP address field 1714, a Room field 1716, a Floor level field 1718, a contact field 1722, a contact phone field 1724, a contact email field 1726, a contact fax field 1728, an address 1 field 1730, address 2 area 1732, address 3 area field 1734, address 4 field 1736, and city field 1738.

Location area 1702 is configured for entering a location associated with the sensor. In some embodiment, location area 1702 allows selection of a location in the sensor management system via a drop down. Name area 1704 is configured for entry of a name associated with the sensor. MAC address area 1706 is configured for entering a MAC address associated with the sensor. Description area 1708 is configured for entering a description associated with the sensor.

Latitude area 1710 and longitude area 1712 are configured for entering the latitude and longitude, respectively, associated with the sensor. IP address area 1714 is configured for entering an IP address associated with the sensor. Room area 1716 is configured for entering a room associated with the sensor. Floor level area 1718 is configured for entering a floor level associated with the sensor. Contact area 1722 is configured for entering a contact (e.g., person) associated with the sensor. Contact phone area 1724 is configured for entering a contact phone number associated with the sensor. Contact email area 1726 is configured for entering a contact email address associated with the sensor. Contact fax area 1728 is configured for entering' a contact fax number associated with the sensor. Address 1 area 1730 is configured for entering a first address line associated with the sensor. Address 2 area 1732 is configured for entering a second address line associated with the sensor. Address 3 area 1734 is configured for entering a third address line associated with the sensor. Address 4 area 1736 is configured for entering a fourth address line associated with the sensor. City field 1738 is configured for entering a city associated with the sensor.

Elements of the exemplary graphical user interface 1700 having the same reference numerals as in exemplary graphical user interface 700 and exemplary graphical user interface 1600 may perform substantially similar functions as described herein with respect to exemplary graphical user interface 700 and exemplary graphical user interface 1600.

Figure 18:
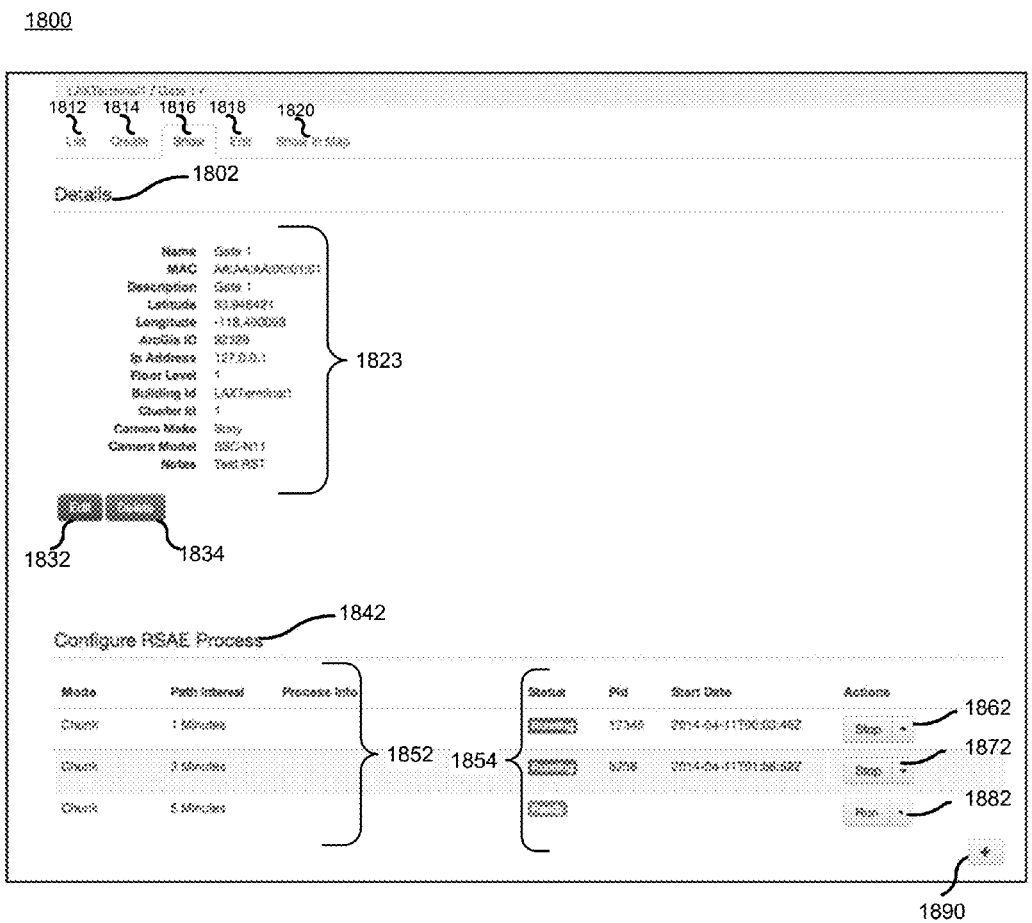
FIG. 18 shows a block diagram of an exemplary graphical user interface configured for displaying details associated with a sensor in accordance with one embodiment.

FIG. 18 shows a block diagram of an exemplary graphical user interface configured for displaying the details associated with a sensor in accordance with one embodiment. The exemplary graphical user interface 1800 may be displayed upon selection of a sensor (e.g., via FIG. 16). The exemplary graphical user interface 1800 includes a details label 1802, sensor details 1823, an edit button 1832, a delete button 1834, a configure sensor analytics process label 1842, sensor analytics process information 1852, sensor analytics process status information 1854, an action drop down menus 1862-1882, and an add button 1890.

The details label 1802 indicates that details of a sensor are being displayed. The sensor details list 1823 includes details of the selected sensor (e.g., as entered via FIG. 17). The edit button 1832 is configured to edit the sensor data (e.g., FIG. 19). The delete button 1834 is configured to delete an entry associated with the selected sensor. In some embodiments, deleting an entry associated with the sensor also deletes the associated channel paths. The configure sensor analytics process label 1842 is configured for indicating an area with sensor analytics processes configuration information.

The sensor analytics process information 1852 for displays information associated with a sensor analytics processes (e.g., mode (e.g., capture, HIT, or CHUNK), channel path interval, process information, etc.). The sensor analytics process status information 1854 displays operational information associated with the status of sensor analytics processes (e.g., status, Pid, start date and time, etc.). The action drop down menus 1862-1882 are configured to change the operational status of an associated sensor analytics process (e.g., stop, start, etc.). The add button 1890 is configured add additional sensor analytics processes.

Elements of the exemplary graphical user interface 1800 having the same reference numerals as in exemplary graphical user interface 700 and exemplary graphical user interface 1600 may perform substantially similar functions as described herein with respect to exemplary graphical user interface 700 and exemplary graphical user interface 1600.

Figure 19:
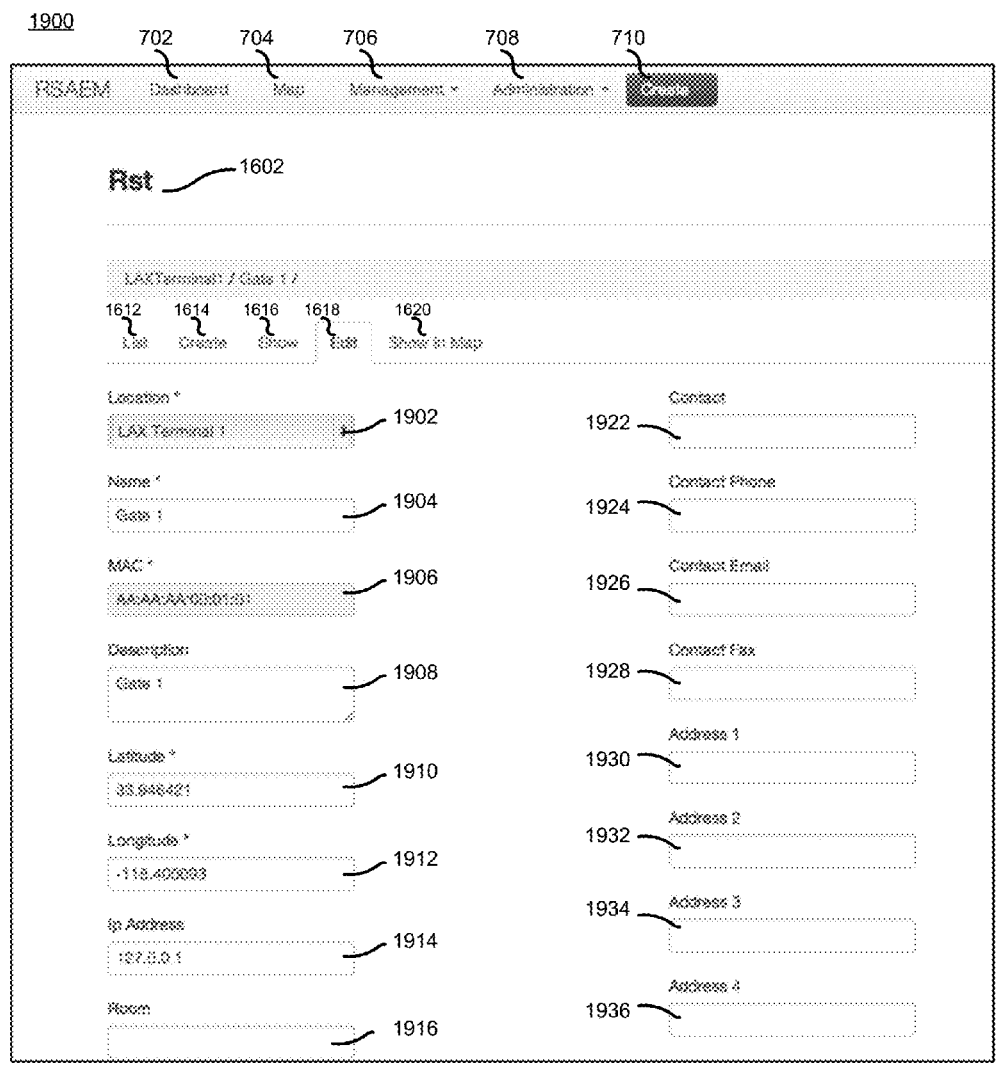
FIG. 19 shows a block diagram of an exemplary graphical user interface configured for editing sensor information in accordance with one embodiment.

FIG. 19 shows a block diagram of an exemplary graphical user interface configured for editing sensor information in accordance with one embodiment. The exemplary graphical user interface 1900 depicts an interface for editing information associated with a sensor (e.g., sensor metadata).

The exemplary graphical user interface 1900 includes a location field 1902, a name field 1904, a MAC address field 1906, a description field 1908, a latitude field 1910, a longitude a field area 1912, an IP address field 1914, a Room field 1916, a Floor level field 1918, a contact field 1922, a contact phone field 1924, a contact email field 1926, a contact fax field 1928, an address 1 field 1930, an address 2 field 1932, an address 3 field 1934, and an address 4 field 1936.

The location field 1902 is configured to display and edit a location associated with the sensor. In some embodiments, the location field 1902 allows selection of a location in the sensor management system via a drop down menu. The name area 1904 is configured to display and edit a name associated with the sensor. The MAC address area 1906 is configured to display and edit the MAC address associated with the sensor. The description area 1908 is configured to display and edit a description associated with the sensor.

The latitude field 1910 and longitude field are configured to display and edit the latitude and longitude, respectively, associated with the sensor. The IP address field 1914 is configured to display and edit the IP address associated with the sensor. The Room field 1916 is configured to display and edit the room associated with the sensor. Floor level field 1918 is configured to display and edit the floor level associated with the sensor. The contact field 1922 is configured to display and edit the contact (e.g., person) associated with the sensor. Contact phone field 1924 is configured to display and edit the phone number associated with the sensor. Contact email field 1926 is configured to display and edit the contact email address associated with the sensor. Contact fax field 1928 is configured to display and edit the contact fax number associated with the sensor. Address 1 field 1930 is configured to display and edit the first address line associated with the sensor. Address 2 field 1932 is configured to display and edit the second address line associated with the sensor. Address 3 field 1934 is configured to display and edit the third address line associated with the sensor. Address 4 field 1936 is configured to display and edit the fourth address line associated with the sensor.

Elements of the exemplary graphical user interface 1900 having the same reference numerals as in exemplary graphical user interface 700 and exemplary graphical user interface 1600 may perform substantially similar functions as described herein with respect to exemplary graphical user interface 700 and exemplary graphical user interface 1600.

Figure 20:
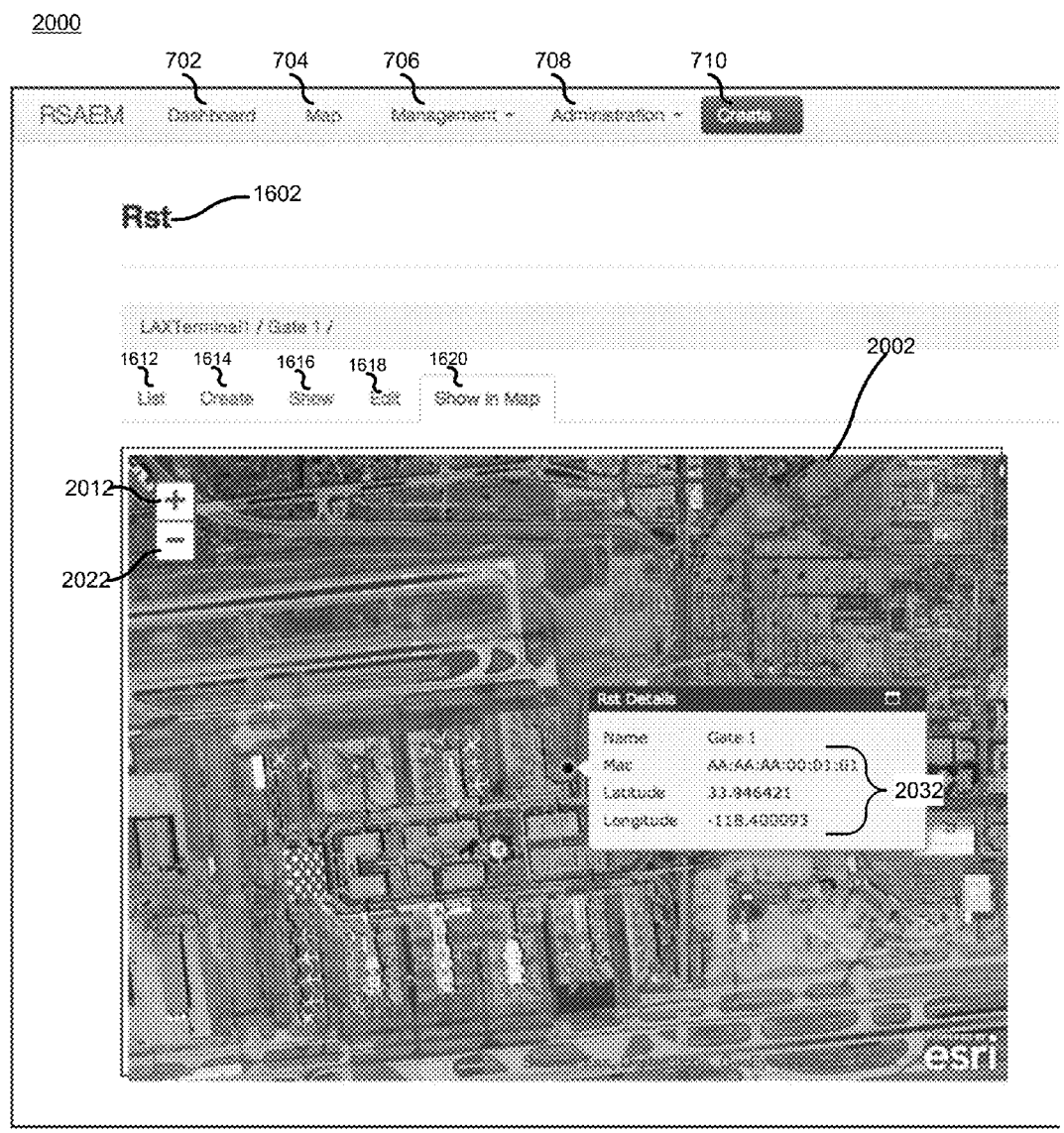
FIG. 20 shows a block diagram of an exemplary graphical user interface configured for displaying sensor information in a geographical context in accordance with one embodiment.

FIG. 20 shows a block diagram of an exemplary graphical user interface configured for displaying sensor information in a geographical context in accordance with one embodiment. The exemplary graphical user interface 2000 includes a map 2002, location details area 2032, a zoom in 2012, and a zoom out 2022 buttons.

The map 2002 displays a map including an indicator of a location of a sensor. The location details area 2032 displays location details (e.g., name, latitude, longitude, etc.) associated with the sensor displayed in map 2002. The zoom in button 2012 and zoom out buttons are configured to zoom in or zoom out, respectively, on the map 2002.

Elements of the exemplary graphical user interface 2000 having the same reference numerals as in exemplary graphical user interface 700 and exemplary graphical user interface 1600 may perform substantially similar functions as described herein with respect to exemplary graphical user interface 700 and exemplary graphical user interface 1600.

Figure 21:
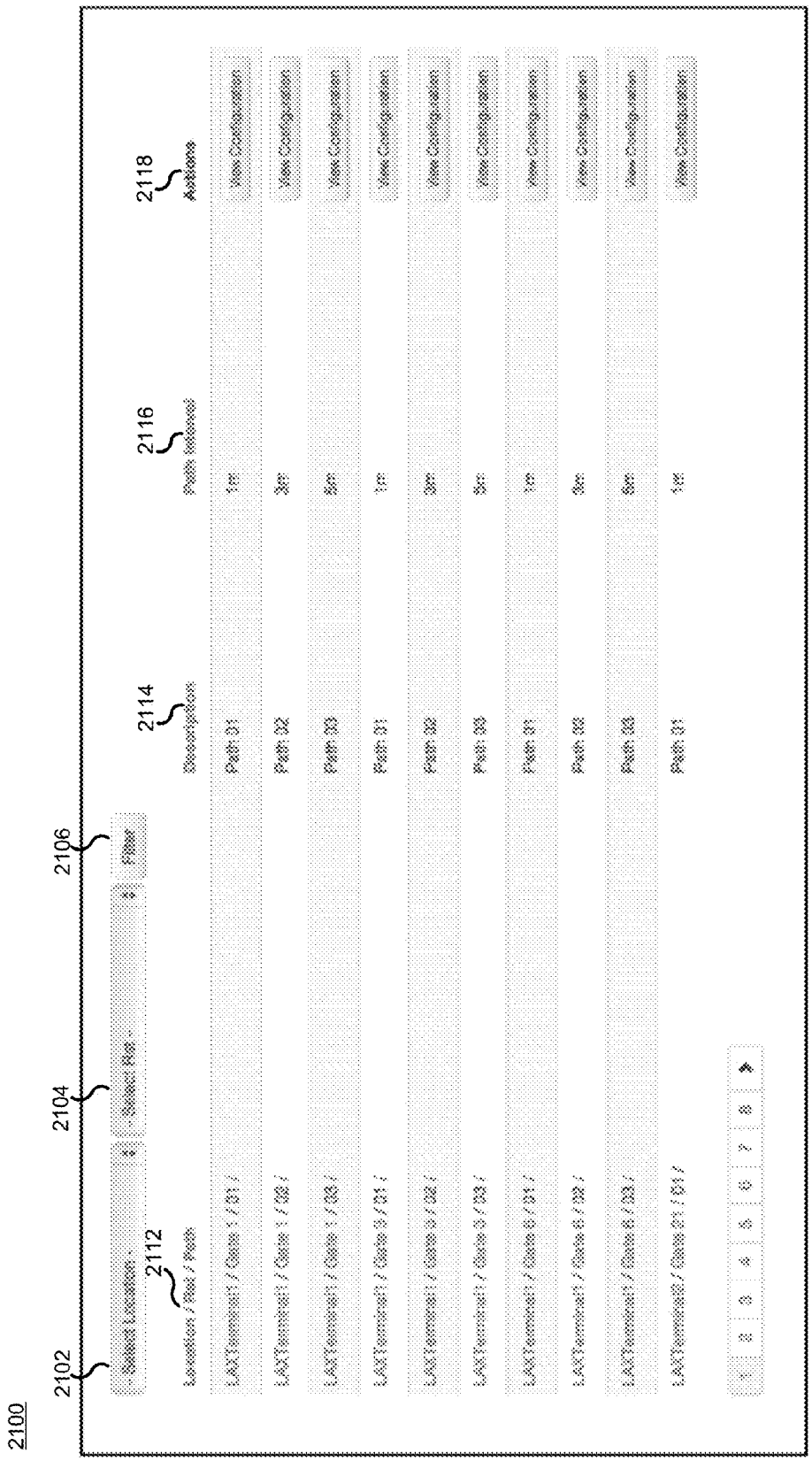
FIG. 21 shows a block diagram of an exemplary graphical user interface configured for displaying a listing of sensor analytics processes in accordance with one embodiment.

FIG. 21 shows a block diagram of an exemplary graphical user interface configured for displaying a listing of sensor analytics processes in accordance with one embodiment. The exemplary graphical user interface 2100 depicts a graphical user interface for viewing sensor analytics process configurations. The exemplary graphical user interface 2100 includes a location selector 2102, a sensor selector 2104, a filter button 2106, a location/sensor/channel path column 2112, a description column 2114, a path interval column 2116, and an action column 2118.

The location selector 2102 is configured to select a location to be used as a filter for the sensor analytics process lists. The sensor selector 2104 is configured to select a sensor to be used as a filter of sensor analytics process lists. The filter button 2106 is configured to filter the sensor analytics process lists based on the selection of a location and/or sensor. The location/sensor/channel path column 2112 displays the corresponding location, a sensor, and a channel path for each sensor analytics process. The description column 2114 displays the corresponding description of each sensor analytics process. The path interval column 2116 displays the time interval of each sensor analytics process. The action column 2118 is configured to display the configuration of the corresponding sensor analytics process.

Figure 22:
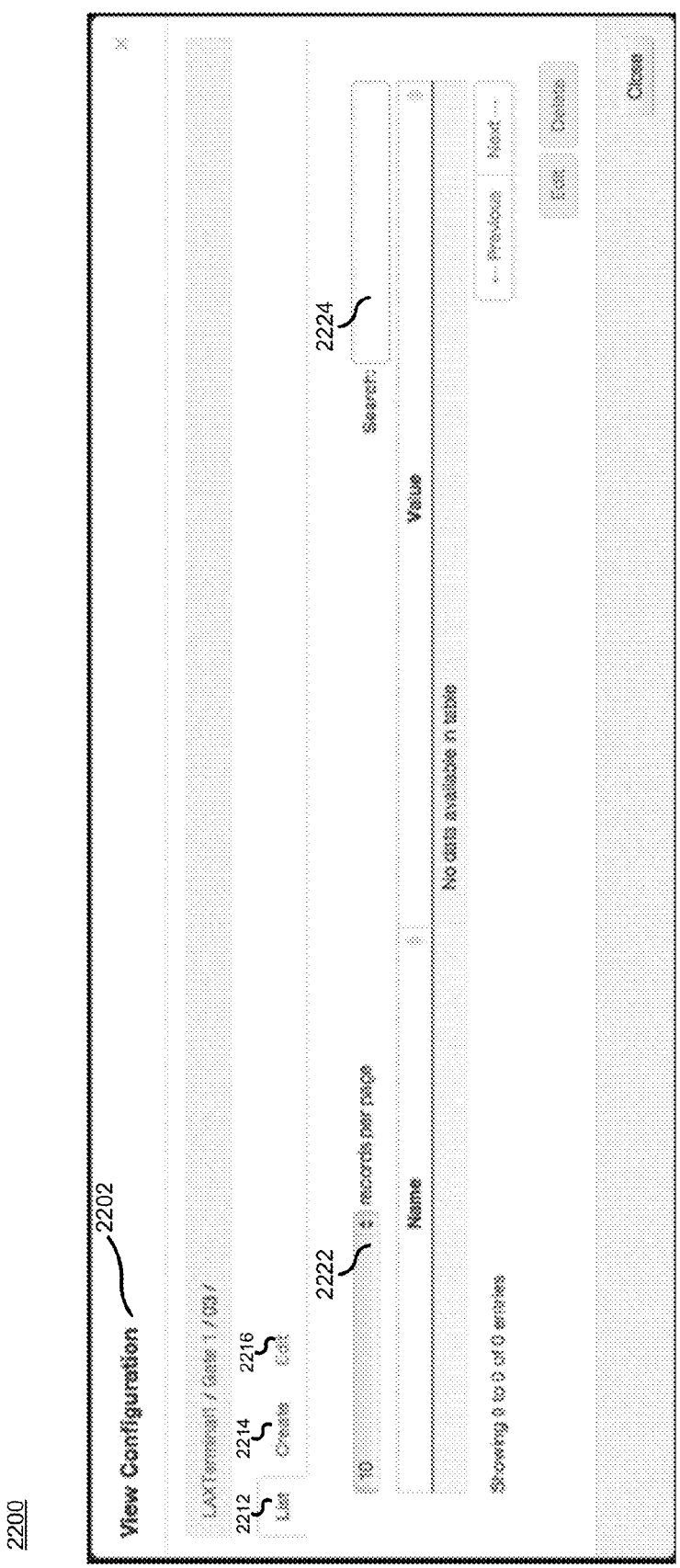
FIG. 22 shows a block diagram of an exemplary graphical user interface configured for displaying a configuration of a respective sensor analytics process in accordance with one embodiment.

FIG. 22 shows a block diagram of an exemplary graphical user interface configured for displaying the configuration of a sensor analytics process in accordance with one embodiment. The exemplary graphical user interface 2200 depicts a graphical user interface for displaying the individual configurations of each sensor analytics process. The exemplary graphical user interface 2200 includes a view configuration label 2202, a list tab 2212, a create tab 2214, an edit tab 2216, a records per page selector 2222 (e.g., drop down), and a search field 2224.

The view configuration label 2202 is configured to indicate that a configuration of a sensor analytics process is being displayed. The list tab 2212 is configured to display a list of sensor analytics process configurations. The create tab 2214 is configured to create a sensor analytics process configuration. The edit tab 2216 is configured to edit a sensor analytics process configuration. The records per page selector 2222 selects the number of sensor analytics configurations to display on a page. The search field 2224 is configured for searching sensor analytics process configurations.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

Figure 23:
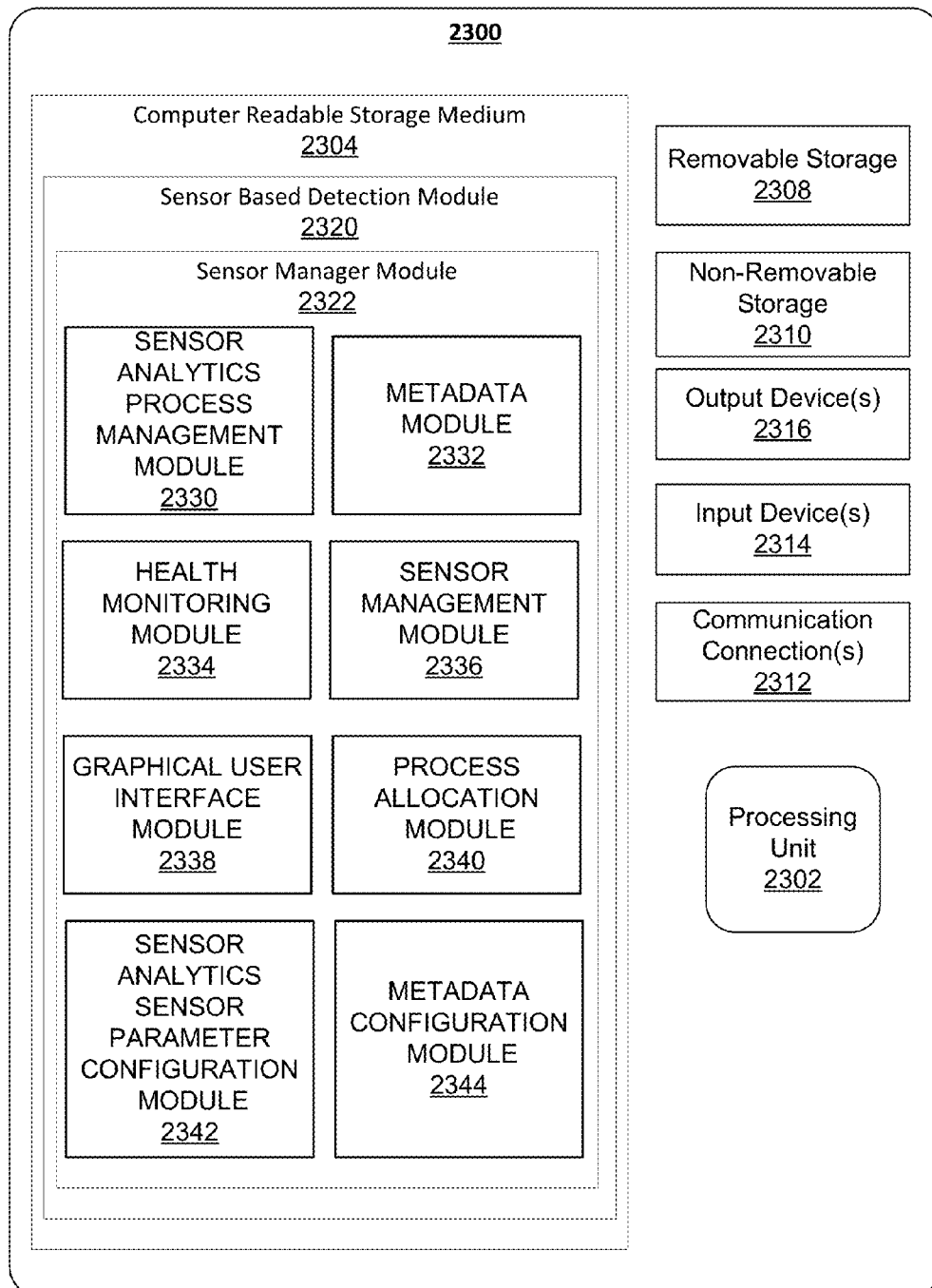
FIG. 23 shows a block diagram of an exemplary computer system in accordance with one embodiment.

Referring now to FIG. 23, a block diagram of an exemplary computer system in accordance with one embodiment is shown. With reference to FIG. 23, an exemplary system module for implementing embodiments disclosed above, such as the embodiments described in FIGS. 1-22. In some embodiments, the system includes a general purpose computing system environment, such as computing system environment 2300. Computing system environment 2300 may include, but is not limited to, servers, desktop computers, laptops, tablets, mobile devices, and smartphones. In its most basic configuration, computing system environment 2300 typically includes at least one processing unit 2302 and computer readable storage medium 2304. Depending on the exact configuration and type of computing system environment, computer readable storage medium 2304 may be volatile (such as RAM), non-volatile (such as ROM, flash memory, etc.) or some combination of the two. Portions of computer readable storage medium 2304 when executed facilitate monitoring and management of sensors and sensor analytics processes according to embodiments described above (e.g., processes 400-500).

Additionally in various embodiments, computing system environment 2300 may also have other features/functionality. For example, computing system environment 2300 may also include additional storage (removable and/or non-removable) including, but not limited to, magnetic or optical disks or tape. Such additional storage is illustrated by removable storage 2308 and non-removable storage 2310. Computer storage media includes volatile and nonvolatile, removable and non-removable media implemented in any method or technology for storage of information such as computer readable instructions, data structures, program modules or other data. Computer readable medium 2304, removable storage 2308 and nonremovable storage 2310 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 2300. Any such computer storage media may be part of computing system environment 2300.

In some embodiments, computing system environment 2300 may also contain communications connection(s) 2312 that allow it to communicate with other devices. Communications connection(s) 2312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Communications connection(s) 2312 may allow computing system environment 2300 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 2312 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 2300 may also have input device(s) 2314 such as keyboard, mouse, a terminal or terminal emulator (either directly connected or remotely accessible via telnet, SSH, HTTP, SSL, etc.), pen, voice input device, touch input device, remote control, etc. Output device(s) 2316 such as a display, a terminal or terminal emulator (either directly connected or remotely accessible via telnet, SSH, HTTP, SSL, etc.), speakers, LEDs, etc. may also be included.

In one embodiment, computer readable storage medium 2304 includes sensor based detection module 2320. Sensor based detection module 2320 is configured for monitoring and management of a plurality of sensors and associated analytics (e.g., sensor based detection system 102). Sensor based detection module 2320 includes sensor manager module 2322. Sensor manager module 2322 is configured for managing sensor reading collection, sensor analytics, sensor data management, and load balancing.

Sensor manager module 2322 includes an analytics process management module 2330, a metadata module 2332, a health monitoring module 2334, a sensor management module 2336, a graphical user interface module 2338, a process allocation module 2340, an analytics engine parameter configuration module 2342, and a metadata configuration module 2344.

The analytics process management module 2330 is configured to access the sensor analytics process configuration parameters and initiate the sensor analytics processes, as described above. The metadata module 2332 is configured to access and update metadata associated with a plurality of sensors, as described herein. The health monitoring module 2334 is configured to determine the health indicator of a sensor of a plurality of sensor analytics processes, as described herein.

The sensor management module 2336 is configured to manage the metadata of a plurality of sensors (e.g., via the graphical user interface module 2338), as described herein. Graphical user interface module 2338 is configured to display a graphical user interface for management of a plurality of sensor analytics processes and management the respective sensor metadata, as described herein. The process allocation module 2340 is configured to allocate sensor analytics processes over a plurality of execution units (e.g., for load balancing), as described herein.

The sensor analytics process parameter configuration module 2342 is configured to set, modify, add, or delete of sensor analytics processes (e.g., via graphical user interface module 2338), as described herein. The metadata configuration module 2344 is configured to set, modify, add, or delete sensor metadata (e.g., via graphical user interface module 2338), as described herein.

Figure 24:
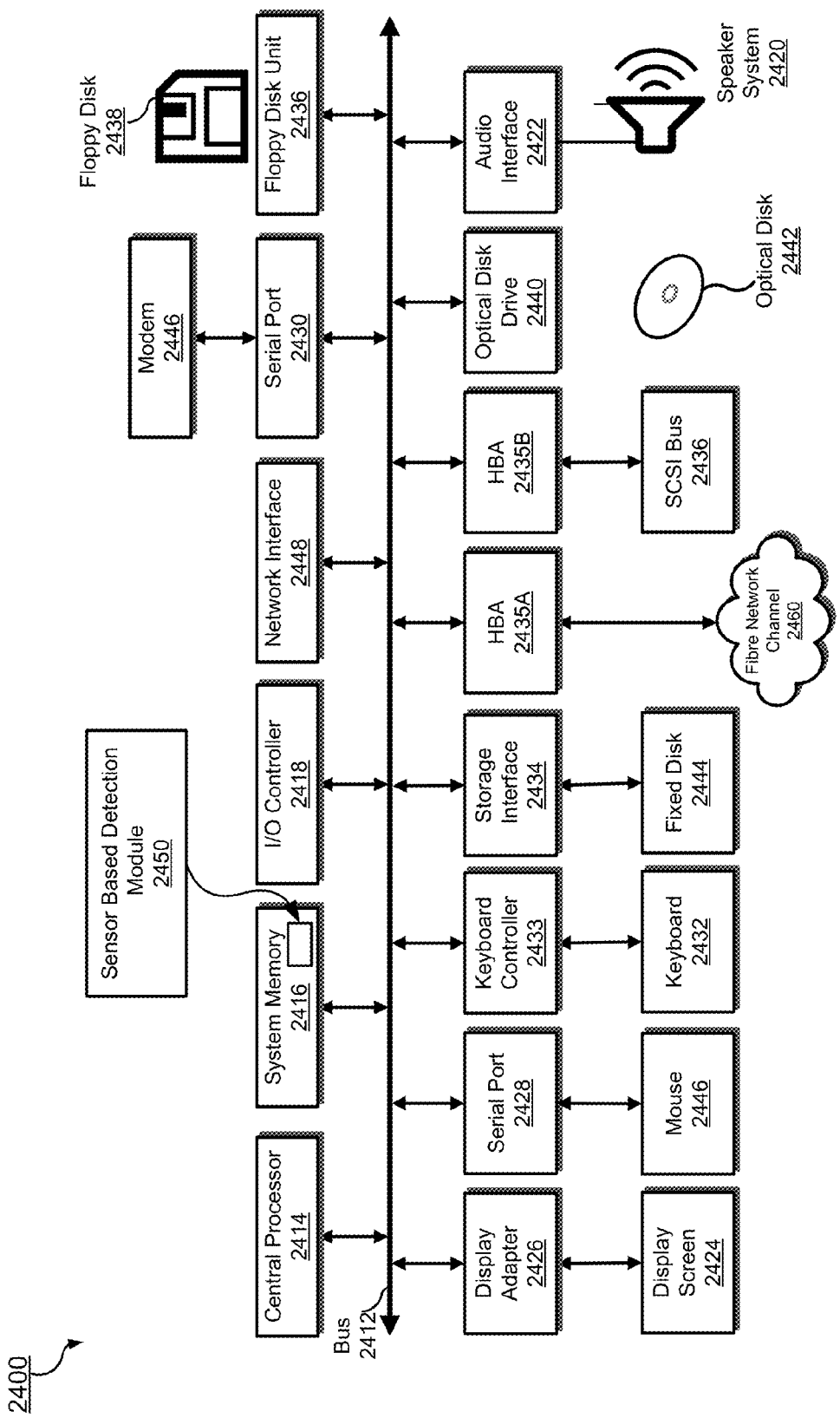
FIG. 24 shows a block diagram of another exemplary computer system in accordance with one embodiment.

Referring now to FIG. 24, a block diagram of another exemplary computer system in accordance with one embodiment is shown. FIG. 24 depicts a block diagram of a computer system 2400 suitable for implementing the present disclosure. Computer system 2400 includes a bus 2412 which connects the major subsystems of the computer system 2400, such as a central processor 2414, a system memory 2416 (typically RAM, but which may also include ROM, flash RAM, or the like), an input/output controller 2418, an external audio device, such as a speaker system 2420 via an audio output interface 2422, an external device, such as a display screen 2424 via a display adapter 2426, serial ports 2428 and 2430, a keyboard 2432 (interfaced with a keyboard controller 2433), a storage interface 2434, a floppy disk drive 2436 operative to receive a floppy disk 2438, a host bus adapter (HBA) interface card 2435A operative to connect with a Fibre Channel network 2460, a host bus adapter (HBA) interface card 2435B operative to connect to a Small Computer System Interface (SCSI) bus 2436, and an optical disk drive 2440 operative to receive an optical disk 2442. Also included are a mouse 2446 (or other point-and-click device, coupled to bus 2412 via serial port 2428), a modem 2446 (coupled to bus 2412 via serial port 2430), and a network interface 2448 (coupled directly to bus 2412).

It is appreciated that the network interface 2448 may include one or more Ethernet ports, wireless local area network (WLAN) interfaces, etc., but is not limited thereto. System memory 2416 includes a sensor analytics manager module 2450, which is configured for monitoring and managing a plurality of sensor analytics processes and storage of sensor analytics data. According to one embodiment, the sensor analytics manager module 2450 may include other modules for carrying out various tasks (e.g., modules of FIG. 23). It is appreciated that the sensor analytics manager module 2450 may be located anywhere in the system and is not limited to the system memory 2416. As such, residing within the system memory 2416 is merely exemplary and not intended to limit the scope of the embodiments. For example, parts of the sensor analytics manager module 2450 may be located within the central processor 2414 and/or the network interface 2448 but are not limited thereto.

The bus 2412 allows data communication between the central processor 2414 and the system memory 2416, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 2400 are generally stored on and accessed via a computer readable medium, such as a hard disk drive (e.g., fixed disk 2444), an optical drive (e.g., optical drive 2440), a floppy disk unit 2436, or other storage medium. Additionally, applications can be in the form of electronic signals modulated in accordance with the application and data communication technology when accessed via modem 2446 or network interface 2448.

The storage interface 2434, as with the other storage interfaces of computer system 2400, can connect to a standard computer readable medium for storage and/or retrieval of information, such as a fixed disk drive 2444. A fixed disk drive 2444 may be a part of computer system 2400 or may be separate and accessed through other interface systems. The network interface 2448 may provide multiple connections to networked devices. Furthermore, a modem 2446 may provide a direct connection to a remote server via a telephone link or to the Internet via an Internet service provider (ISP). The network interface 2448 provides one or more connections to a data network, which may consist of any number of other network-connected devices. The network interface 2448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, not all of the devices shown in FIG. 24 need to be present to practice the present disclosure. The devices and subsystems can be interconnected in different ways from that shown in FIG. 24. Code to implement the present disclosure can be stored in computer-readable storage media such as one or more of system memory 2416, fixed disk 2444, optical disk 2442, or floppy disk 2438. The operating system provided on computer system 2400 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

What is claimed is:

1. A computer implemented method comprising:
   receiving a plurality of configuration parameters associated with a plurality of sensor analytics processes;
   initiating the plurality of sensor analytics processes based on the plurality of configuration parameters, wherein each sensor analytics process of the plurality of sensor analytics processes is associated with a respective sensor;
   receiving analytics data from the plurality of sensor analytics processes;
   storing the analytics data from the plurality of sensor analytics processes in a non-transitory storage medium; and
   determining an allocation of the plurality of sensor analytics processes based on the plurality of configuration parameters over a plurality of execution units, wherein an execution unit of the plurality of execution units is configured to execute one or more of the sensor analytics processes.

2. The method as described in claim 1, wherein the analytics data is stored in a data warehouse, and wherein processing of the analytics data is configured to determine whether a state change associated with a sensor has occurred.

3. The method as described in claim 1 further comprising:
   displaying a group of configuration parameters of the plurality of configuration parameters that is associated with a sensor analytics process of the plurality of sensor analytics processes in a graphical user interface;

receiving a request to modify the group of configuration parameters; and updating configuration parameters of the group of configuration parameters based on the request.

4. The method as described in claim 1 further comprising:

accessing metadata associated with a sensor of the plurality of sensors, wherein the storing further comprises storing the metadata associated with the sensor of the plurality of sensors with respective analytics data from a respective sensor analytics process of the plurality of sensor analytics processes.

5. The method as described in claim 4 further comprising:

displaying the metadata associated with the sensor of the plurality of sensors in a graphical user interface;

receiving a request to modify the metadata associated with the sensor of the plurality of sensors; and updating the metadata associated with the sensor of the plurality of sensors based on the request.

6. The method as described in claim 4, wherein the metadata comprises location information associated with the sensor of the plurality of sensors.

7. The method as described in claim 1, wherein an execution unit of the plurality of execution units is a virtual machine.

8. The method as described in claim 1 further comprising:

determining a health indicator associated with a sensor analytics process of the plurality of sensor analytics processes, wherein the determining is based on respective analytics data received from the respective sensor analytics process.

9. A computer implemented method comprising:

receiving configuration parameters associated with a sensor analytics process that is associated with a sensor of a plurality of sensors;

accessing metadata associated with the sensor;

initiating the sensor analytics process based on the configuration parameters;

receiving analytics data from the sensor analytics process;

storing the analytics data with the metadata in a non-transitory storage medium;

receiving configuration parameters associated with other sensor analytics processes;

initiating the other sensor analytics processes based on the configuration parameters associated with the other sensor analytics processes; and determining an allocation of the plurality of sensor analytics processes based on the plurality of configuration parameters over a plurality of execution units, wherein an execution unit is configured to execute at least two sensor analytics processes.

10. The method of claim 9 further comprising:

determining a health indicator of the sensor analytics process based on the analytics data received from the sensor analytics process.

11. The method of claim 10 further comprising:

restarting the sensor analytics process in response to determining that the sensor analytics process is associated with a negative health indicator.

12. The method as described in claim 9, wherein an execution unit of the plurality of execution units is a virtual machine.

13. The method of claim 9, wherein the metadata comprises location information of the sensor.

14. The method of claim 9, wherein the analytics data and meta data are stored in a data warehouse configured to determine a state change of the sensor based on the analytics data.

15. A non-transitory computer-readable storage medium having stored thereon, computer executable instructions that, if executed by a device, causes the device to perform a method comprising:

receiving configuration parameters associated with a sensor analytics process;

initiating the sensor analytics process based on the configuration parameters, wherein the sensor analytics process is associated with a sensor of a plurality of sensors;

receiving analytics data from the sensor analytics process;

determining a health indicator of the sensor analytics process based on analytics data received from the sensor analytics process;

storing the analytics data from the sensor analytics process in a non-transitory storage medium; and determining an allocation of the plurality of sensor analytics processes based on the plurality of configuration parameters over a plurality of execution units, wherein an execution unit is configured to execute at least two sensor analytics processes.

16. The non-transitory computer-readable storage medium of claim 15, wherein the method further comprises:

reconfiguring the sensor analytics process based on the health indicator.

17. The non-transitory computer-readable storage medium of claim 15, wherein the method further comprises:

receiving configuration parameters associated with other sensor analytics processes; and initiating the other sensor analytics processes based on the configuration parameters associated with the other sensor analytics processes.

18. The non-transitory computer-readable storage medium of claim 17, wherein an execution unit of the plurality of the execution units is a virtual machine.

* * * * *